(12) United States Patent
Lemelson et al.

(10) Patent No.: US 6,437,696 B1
(45) Date of Patent: *Aug. 20, 2002

(54) PRISONER TRACKING AND WARNING SYSTEM AND CORRESPONDING METHODS

(76) Inventors: Jerome H. Lemelson, *deceased*, late of Incline Village, NV (US), by Dorothy Lemelson, executrix; by Dorothy Lemelson, executrix, Unit 802, Suite 286 930 Tahoe Blvd., Incline Village, NV (US) 89451; Robert D. Pedersen, 7808 Glenneagle, Dallas, TX (US) 75248; John H. Hiett, 17625 N. Seventh St. Unit 2301, Phoenix, AZ (US) 85022

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/514,771

(22) Filed: Feb. 28, 2000

Related U.S. Application Data

(63) Continuation of application No. 09/090,665, filed on Jun. 4, 1998, now Pat. No. 6,054,928.

(51) Int. Cl.$^7$ ............................................. G08B 23/00
(52) U.S. Cl. ............... 340/573.4; 340/539; 340/825.49; 340/825.69; 340/825.72; 600/529; 600/543; 342/357.01; 342/357.06; 342/357.07; 342/357.08; 342/357.09
(58) Field of Search .......................... 340/573.1, 573.4, 340/539, 825.06, 825.08, 825.36, 825.49, 825.69, 825.72; 342/357.01, 357.06, 357.07, 357.08, 357.09; 128/202.21; 600/529, 543, 17

(56) References Cited

U.S. PATENT DOCUMENTS

| | | | |
|---|---|---|---|
| 4,816,377 A | 3/1989 | Collet et al. | 430/296 |
| 4,843,377 A | 6/1989 | Fuller et al. | 340/573 |
| 4,918,425 A | 4/1990 | Greenberg et al. | 340/539 |

(List continued on next page.)

OTHER PUBLICATIONS

Dallas Morning News.*

*Primary Examiner*—Julie Lieu
(74) *Attorney, Agent, or Firm*—Douglas W. Rudy

(57) ABSTRACT

The present invention discloses a general overall system 30 and a general overall method 10 for tracking, monitoring, and learning prisoner or parolee behavior. The system 30 and method 10 involve obtaining prisoner or parolee data and monitoring data for at least one individual prisoner or parolee 38, storing the prisoner or parolee data and monitoring data into a database, learning prisoner or parolee behavior from the prisoner or parolee data and the monitoring data in the database, and updating the prisoner or parolee data and the monitoring data in the database. The present invention involves learning both individual and aggregate prisoner or parolee behavior from the prisoner or parolee data and the monitoring data in the database. The present invention executes expert system (i.e. including but not limited to fuzzy logic, reinforcement learning, neural networks, artificial intelligence, etc.) algorithms for determining and analyzing deviated behavior by the prisoner or parolee 38. The present invention system 30 and method 10 is able to assign a parole level to the prisoner or parolee 38 and determine whether the prisoner or parolee 38 is to be moved up or down a parole level depending on whether the prisoner or parolee behavior does not constitute or does constitute prisoner or parolee violations. Furthermore, the present invention tracks, monitors, and learns the behavior of the prisoner or parolee 38 by controlling and regulating the permitted/prohibited locations or sectors, the permitted/prohibited location or sector dwell times, the permitted/prohibited travel routes, the permitted/prohibited travel times that the prisoner or parolee 38 spend at or between various locations.

24 Claims, 25 Drawing Sheets

U.S. PATENT DOCUMENTS

| | | | | |
|---|---|---|---|---|
| 4,918,432 A | | 4/1990 | Pauley et al. | 340/573 |
| 4,924,211 A | | 5/1990 | Davies | 340/573 |
| 4,943,885 A | | 7/1990 | Willoughby et al. | 361/232 |
| 4,952,913 A | | 8/1990 | Pauley et al. | 340/573 |
| 4,952,928 A | | 8/1990 | Carroll et al. | 340/825.54 |
| 4,980,671 A | | 12/1990 | McCurdy | 340/568 |
| 4,999,613 A | * | 3/1991 | Williamson et al. | 340/573.4 |
| 5,023,901 A | | 6/1991 | Sloan et al. | 379/38 |
| 5,032,823 A | | 7/1991 | Bower et al. | 340/568 |
| 5,075,670 A | | 12/1991 | Bower et al. | 340/573 |
| 5,103,474 A | | 4/1992 | Stoodley et al. | 379/58 |
| 5,117,222 A | | 5/1992 | McCurdy et al. | 340/573 |
| 5,146,207 A | | 9/1992 | Henry et al. | 340/573 |
| 5,170,426 A | | 12/1992 | D'Alessio et al. | 379/38 |
| 5,182,543 A | | 1/1993 | Siegal et al. | 340/531 |
| 5,182,566 A | | 1/1993 | Ferguson et al. | 342/357 |
| 5,187,805 A | | 2/1993 | Bertiger et al. | 455/12.1 |
| 5,202,829 A | | 4/1993 | Geier | 364/449 |
| 5,204,670 A | | 4/1993 | Stinton | 340/825.54 |
| 5,206,897 A | | 4/1993 | Goudreau et al. | 379/38 |
| 5,218,344 A | | 6/1993 | Ricketts | 340/573 |
| 5,223,844 A | | 6/1993 | Mansell et al. | 342/357 |
| 5,225,842 A | | 7/1993 | Brown et al. | 342/357 |
| 5,243,652 A | | 9/1993 | Teare et al. | 380/21 |
| 5,255,306 A | | 10/1993 | Melton et al. | 379/38 |
| 5,266,944 A | | 11/1993 | Carroll et al. | 340/825.36 |
| 5,298,884 A | | 3/1994 | Gilmore et al. | 340/573 |
| 5,323,322 A | | 6/1994 | Mueller et al. | 364/449 |
| 5,341,126 A | | 8/1994 | Boykin | 340/573 |
| 5,345,244 A | | 9/1994 | Gildea et al. | 342/357 |
| 5,359,332 A | | 10/1994 | Allison et al. | 343/357 |
| 5,369,394 A | | 11/1994 | Quirk et al. | 340/551 |
| 5,379,244 A | | 1/1995 | Miyoshi et al. | 364/754 |
| 5,382,958 A | | 1/1995 | FitzGerald | 342/386 |
| 5,389,934 A | | 2/1995 | Kass | 342/357 |
| 5,390,125 A | | 2/1995 | Sennot et al. | 364/449 |
| 5,396,540 A | | 3/1995 | Gooch | 379/59 |
| 5,408,238 A | | 4/1995 | Smith | 342/357 |
| 5,414,432 A | | 5/1995 | Penny, Jr. et al. | 342/357 |
| 5,418,537 A | | 5/1995 | Bird | 342/357 |
| 5,422,813 A | | 6/1995 | Schuchman et al. | 364/449 |
| 5,422,816 A | | 6/1995 | Sprague et al. | 364/449 |
| 5,430,656 A | | 7/1995 | Dekel et al. | 364/449 |
| 5,434,787 A | | 7/1995 | Okamoto et al. | 364/449 |
| 5,448,221 A | | 9/1995 | Weller | 340/539 |
| 5,455,851 A | | 10/1995 | Chaco et al. | 379/38 |
| 5,461,390 A | * | 10/1995 | Hoshen | 342/419 |
| 5,471,197 A | | 11/1995 | McCurdy et al. | 340/573 |
| 5,868,100 A | * | 2/1999 | Marsh | 340/573.4 |
| 5,905,461 A | * | 5/1999 | Nether | 342/357 |
| 6,054,928 A | * | 4/2000 | Lemelson et al. | 340/573.4 |
| 6,072,396 A | * | 6/2000 | Gaukel | 340/573.4 |

* cited by examiner

Prisoner/Parolee Tracking and Monitoring System and Method

Prisoner Sensor/Processor Unit

Prisoner Control Center

Prisoner Drug Detection Device

Detector/Skin Contact

Drug Sensor

Prisoner/Parolee Information
Assignment of Prisoner/Parolee Parole Level & Constraints to a
Prisoner/Parolee
More Specific for Block 22

1. Prisoner/Parolee 1 ———228
   a. Background ———230
   b. Criminal History and Record ———232
   c. Constraints ———234
      1) Allowed Locations ———236
      2) Prohibited Locations ———238
      3) Paths of Travel ———240
      4) Dwell Times ———242
   d. Current Parole Level ———244
   e. Monitoring Data ———246

2. Prisoner/Parolee 2 ———228
   a. Background ———230
   b. Criminal History and Record ———232
   c. Constraints ———234
      1) Allowed Locations ———236
      2) Prohibited Locations ———238
      3) Paths of Travel ———240
      4) Dwell Times ———242
   d. Current Parole Level ———244
   e. Monitoring Data ———246

3. Prisoner/Parolee 3

4. Prisoner/Parolee 4

FIG. 13

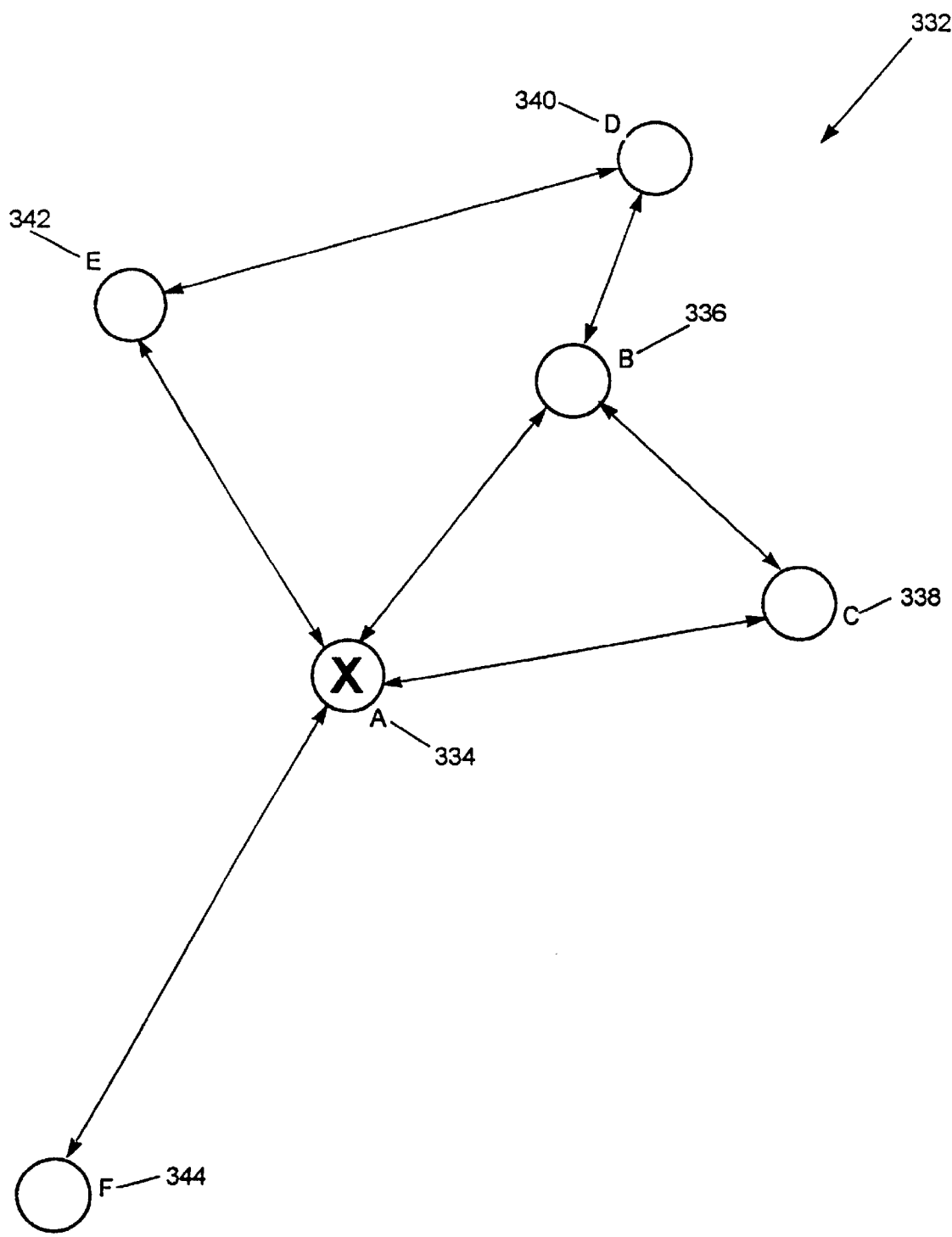
FIG. 19 Prisoner Travel Graph

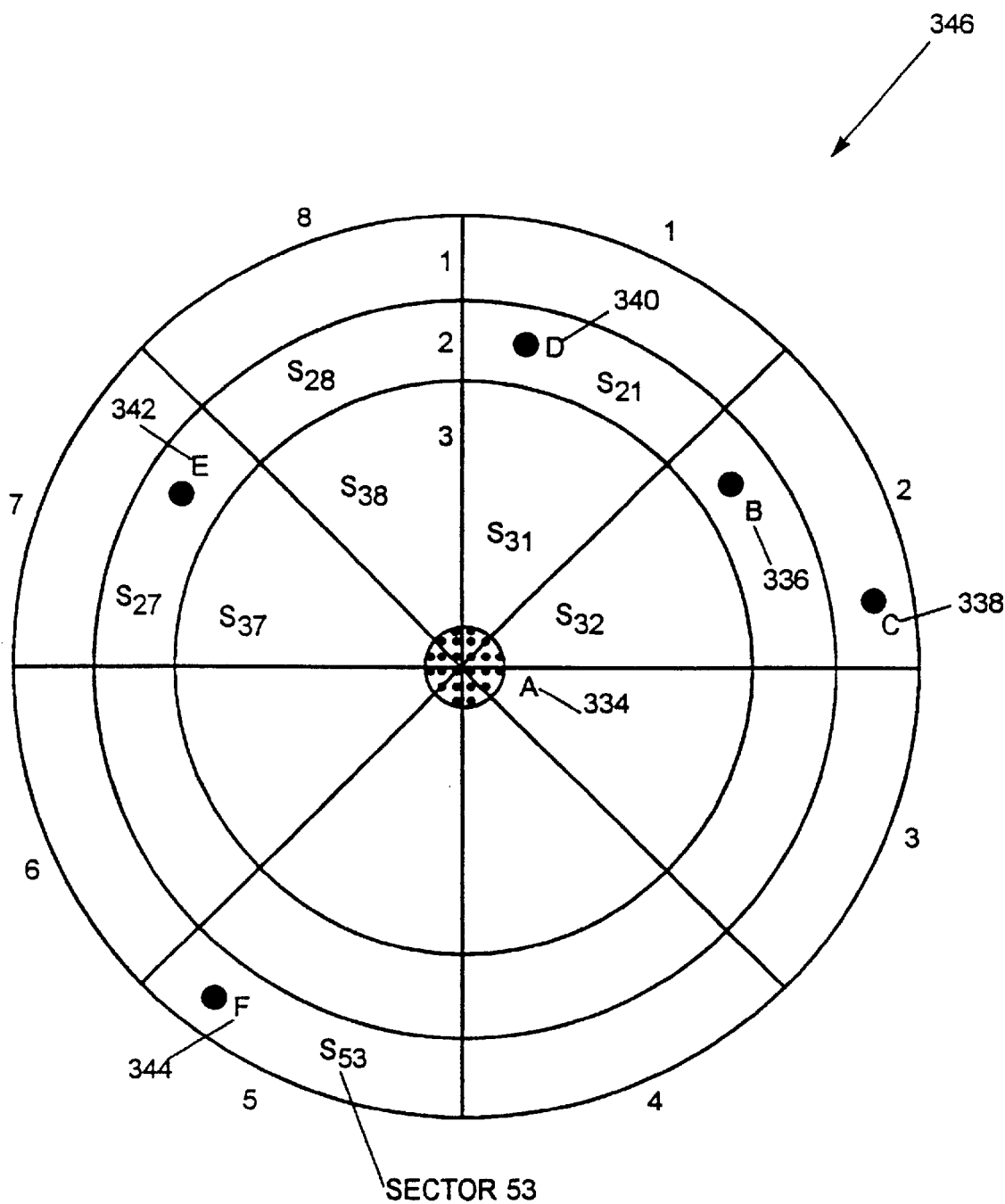
FIG. 20 Ring/Sector Map

|   | 334 A | 336 B | 338 C | 340 D | 342 E | 344 F |
|---|---|---|---|---|---|---|
| 334 A | 0 | 1 | 1 | 0 | 1 | 1 |
| 336 B | 1 | 0 | 1 | 1 | 0 | 0 |
| 338 C | 1 | 1 | 0 | 0 | 1 | 1 |
| 340 D | 0 | 1 | 0 | 0 | 1 | 1 |
| 342 E | 1 | 0 | 0 | 1 | 0 | 0 |
| 344 F | 1 | 0 | 0 | 0 | 0 | 0 |

FIG. 21 Prisoner/Parolee Travel Matrix

|   | 334 A | 336 B | 338 C | 340 D | 342 E | 344 F |
|---|---|---|---|---|---|---|
| 334 A | 0 | 5 | 10 | X | 7 | 20 |
| 336 B | 5 | 0 | 6 | 8 | X | X |
| 338 C | 10 | 6 | 0 | X | X | X |
| 340 D | X | 8 | X | 0 | 10 | X |
| 342 E | 7 | X | X | 10 | 0 | X |
| 344 F | 20 | X | X | X | X | 0 |

FIG. 22 Travel Time Matrix

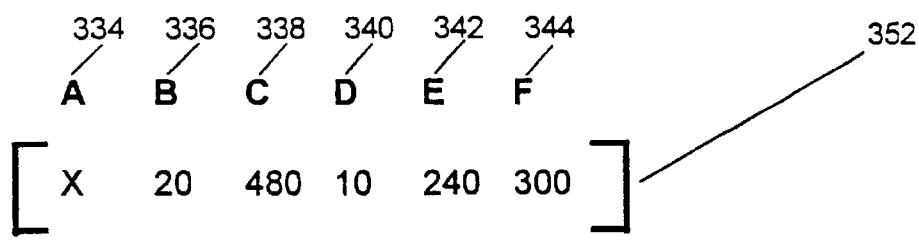
FIG. 23 Location Dwell Time Matrix
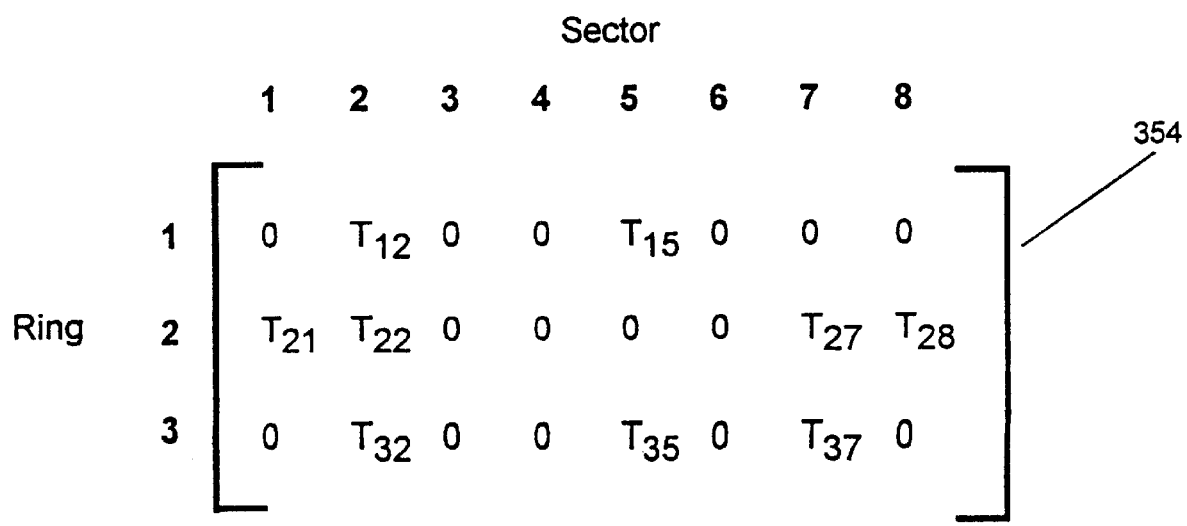
FIG. 24 Ring/Sector Time Matrix Prisoner Tracking and Monitoring Flow Diagram

| Location Type \ Crime Type | Fraud | Auto Theft | Child Molestation | Murder | Shoplifting | Vandalism | Robbery | Arson | Prostitution | Kidnapping | Rape | Drugs | DUI |
|---|---|---|---|---|---|---|---|---|---|---|---|---|---|
| Banks | 100 | 0 | 0 | | | | | | | | | | |
| Bathrooms | 50 | 0 | 50 | | | | | | | | | | |
| Casinos | 60 | 5 | 50 | | | | | | | | | | |
| Fast Food Restaurants | 50 | 0 | 50 | | | | | | | | | | |
| Bars | 50 | 5 | 10 | | | | | | | | | | |
| Rural Areas | 3 | 10 | 50 | | | | | | | | | | |
| Gas Stations | 5 | 40 | 30 | 50 | | | | | | | | | |
| Parking Lots | 10 | 100 | 100 | 100 | | | | | | | | | |
| Residential | 50 | 80 | 100 | 100 | 0 | 100 | | | | | | | |
| Streets & Sidewalks | 50 | 100 | 100 | 100 | 0 | 100 | | | | | | | |
| Parks | 1 | 90 | 100 | 100 | 0 | 0 | | | | | | | |
| Convenience Store-24 Hour | 1 | 70 | 30 | 80 | 100 | 0 | | | | | | | |
| School | 1 | 60 | 100 | 40 | 0 | 70 | | | | | | | |

FIG. 29

PRISONER TRACKING AND WARNING SYSTEM AND CORRESPONDING METHODS

This application is a continuation of Ser. No. 09/090,665 filed Jun. 4, 1998, now U.S. Pat. No. 6,054,928

BACKGROUND OF INVENTION

The inventions described herein relate to the field of prisoner or parolee tracking and warning systems and methods, and more specifically, to comprehensive prisoner or parolee tracking systems and methods using the Global Positioning System ("GPS") to track the movements of prisoners/parolees and an expert system to continually learn, distinguish and report normal and abnormal or prohibited behavior by prisoners/parolees. Additional prisoner/parolee sensors are used to detect and report substance abuse or other alarming or threatening situations.

The control and/or confinement of prisoners/parolees is a complex and expensive problem. The ever increasing rate of various crimes requires incarceration of thousands of persons every year in the United States. Such detentions are extremely costly, requiring elaborate prison systems with attendant physical facilities and large staffs to monitor prisoner activities and to care for prisoners. Yet many crimes for which people are incarcerated do not necessarily represent a severe threat to society. Examples include selected, non-violent or minor offenses or misdemeanors, such as petty theft, shoplifting, etc. In addition, many prisoners, having served portions of prescribed sentences, could possibly be paroled if effective prisoner/parolee tracking, monitoring, and learning systems and methods were available to enable surveillance and continual detecting and learning of their activities while on parole. By restricting the areas within which parolees may move and the times that they may spend traveling or may spend at specific locations, the possibility of repeat offenses may be minimized. As a result, valuable prison space may be reserved for more serious offenders.

There is an increasing interest in remote confinement monitoring systems and methods for monitoring prisoners or parolees. Such systems typically involve a type of house arrest or house detention. Various methods have been described in issued patents for determining whether or not a prisoner or parolee is at a specified location, such as at his house. Field Monitoring Devices (FMD) are sometimes used to record information concerning prisoner or parolee presence. This information is typically transmitted to a centralized control center. Various forms of electronic monitoring technology and identification tags have been previously described for identifying prisoners or parolees and monitoring their general status or behavior. Voice verification methods have been described or taught for identifying particular prisoners or parolees to insure their presence at specified location. Secured straps and tamper-indicating fastening mechanisms that generate alarms if removal is attempted have been disclosed for attaching tags or other identification mechanisms to prisoners or parolees.

However, none of these prior art house arrest or house incarceration systems and methods are known to enable tracking, monitoring and learning of prisoners or parolees and their respective movement or behavior over extended areas nor do they verify travel routes, lengths of times given at locations, lengths of time traveling, avoidance of prohibited areas, and deviations from normal or expected behavior. Also, prior art systems are not capable of actively learning and adapting to a prisoner's or parolee's permissible behavior patterns and reporting deviations from those permissible patterns to a prisoner/parolee control center. Furthermore, the prior art systems do not utilize expert systems or algorithms (i.e. including but not limited to fuzzy logic, neural networks, reinforcement learning, etc.) in providing the capabilities of learning behavior, movement, or patterns of a prisoner or parolee, or of reinforcing acceptable prisoner or parolee behavior by rewarding the prisoner or parolee for proper activities. In addition, prior art prisoner tracking, monitoring, and learning systems have not fully integrated in combination together the capabilities of modem GPS technology, electronic monitoring for detecting substance abuse, and other sensors to detect unusual or suspicious events in the vicinity of prisoners or parolees being tracked and monitored.

Various house arrest, house incarceration and remote confinement systems and methods including systems with electronic monitoring, restraining mechanism, and tamper free security monitoring devices attached to prisoners or parolees are described in the following documents, each of which is incorporated herein by reference: U.S. Pat. Nos. 4,816,377; 4,918,425; 4,918,432; 4,924,211; 4,943,885; 4,952,913; 4,952,928; 4,980,671; 4,999,613; 5,023,901; 5,032,823; 5,075,670; 5,103,474; 5,117,222; 5,146,207; 5,170,426; 5,182,543; 5,204,670; 5,206,897; 5,218,344; 5,255,306; 5,266,944; 5,298,884: 5,341,126; 5,369,394; 5,448,221; 5,455,851; 5,461,390; and 5,471,197.

In addition many patents have been issued for various applications of GPS for locating and tracking objects and for navigation purpose. Various configurations of GPS-based tracking and communication systems and methods are described in the following documents, each of which is incorporated herein by reference: The Navstar Global Positioning System by Tom Logsdon, Van Nostrand and Reinhold, New York (1992), ISBN 0-422-01040-0; GPS Satellite Surveying by Alfred Leick, John Wiley & Sons, New York (1990), ISBN 0-471-81990-05; GPS—A Guide to the Next Utility by Jeff Hurn, Trimble Navigation, Ltd., Sunnyvale, Calif. (1989); Differential GPS Explained by Jeff Hurn, Trimble Navigation Ltd., Sunnyvale, Calif. (1993); and U.S. Pat. Nos: 5,182,566; 5,187,805; 5,202,829; 5,223, 844; 5,225,842; 5,323,322; 5,243,652; 5,345,244; 5,359, 332; 5,379,244; 5,382,958; 5,389,934; 5,390,125; 5,396, 540; 5,408,238; 5,414,432; 5,418,537; 5,422,813; 5422,816; 5,430,656; and 5,434,787.

Furthermore, expert systems (i.e. including but not limited to fuzzy logic, neural networks, reinforcement learning, etc.) are well known to those of ordinary skill in the art, as reflected in the following publications, each of which is incorporated by reference herein: Harmon, Paul and King, David, *Artificial Intelligence in Business—Expert Systems,* John Wiley & Sons, New York (1985), ISBN 0-471-81554-3; Gottinger, H. and Weimann, H., *Artificial Intelligence—a tool for industry and management,* Ellis Horwood, New York (1990), ISBN 0-13-048372-9; Mirzai, A. R., *Artificial Intelligence— Concepts and applications in engineering,* Chapman and Hall, New York (1990), ISBN 0-412-37900-7; Bourbakis, N., *Artificial Intelligence Methods and Applications,* World Scientific, New Jersey (1992), ISBN 981-02-1057-4; Schalkoff, R., *Artificial Intelligence: An Engineering Approach,* McGraw-Hill, New York (1990), ISBN 0-070-55084-0; Frenzel Jr., L., *Crash Course in Artificial Intelligence and Expert Systems,* Howard W. Sams & Co., Indianapolis, Ind. (1987), ISBN 0-672-22443-7. However, expert systems, fuzzy logic, neural networks, reinforcement learning, etc. do not appear to have been used or applied in the prisoner behavior tracking, monitoring, and learning areas.

Various techniques have also been disclosed and implemented for monitoring vital signs of persons, including breath analyzers, sweat analyzers, and heart rate monitors. However, a totally integrated prisoner/parolee monitoring and tracking system and method that makes optimum use of location, travel, and GPS tracking, physical monitoring, security system technology, and expert systems and methods is not disclosed in the prior art.

SUMMARY OF INVENTION

It is an object of these inventions to provide new and useful prisoner/parolee tracking, monitoring, warning, and learning and reinforcing systems and methods that permit tracking the movements of prisoners/parolees, while at the same time learning, updating and reporting unusual or prohibited travel of a prisoner/parolee.

It is a further object of these inventions to provide prisoner or parolee tracking, monitoring, warning, and learning systems and methods that make use of the existing Global Positioning System ("GPS") to permit accurate determination of the location of individual prisoners/parolees.

Another object of these inventions is to provide prisoner/parolee tracking, monitoring, warning, and learning systems and methods that permit definition of specific authorized locations or destinations for each prisoner/parolee.

It is yet another object of these inventions to provide prisoner/parolee tracking, monitoring, warning, and learning systems and methods that permit comparison of travel times of a prisoner/parolee between locations with predetermined or predicted travel times to ensure that the prisoner/parolee proceeds directly between prescribed points in his or her travels.

It is another object of these inventions to provide predetermined time durations specifying a maximum permitted time that a prisoner/parolee may stay at a specific location.

It is yet another object of these inventions to permit definition of areas to which the prisoner/parolee may travel to or through to the exclusion of other areas, and to reward extended periods of good behavior with expanded areas and durations of authorized travel.

Still a further object of these inventions is to provide the above described capabilities within the context of an expert system that is capable of learning individual prisoner/parolee behavior patterns and making notes of and/or generating alarm signals only when those patterns are violated in a suspicious manner, and further, that penalizes improper behavior by restricting areas and periods of travel.

It is another object of these inventions to provide prisoner/parolee tracking, monitoring, warning, and learning systems and methods that make use of reinforcement learning whereby prisoners/parolees are rewarded for conformance to specified behavior patterns.

It is still a further object of these inventions to provide prisoner/parolee tracking, monitoring, warning, and learning systems and methods that permit simultaneous tracking of a multitude of prisoners/parolees from a prisoner/parolee control center.

Yet a further object of these inventions is to provide prisoner/parolee tracking, monitoring, warning, and learning systems and methods that permit dispatching of police or other law enforcement personnel when dangerous situations are detected that involve prisoners/parolees.

Still a further object of these inventions is to provide prisoner/parolee tracking, monitoring, warning, and learning systems and methods that enable physical monitoring of prisoners/parolees including, for example, monitoring prisoner/parolee heart rate and chemical composition of prisoner/parolee perspiration to detect excited or agitated states of prisoners/parolees or the presence of intoxicating drugs, alcohol or other substances within the prisoner's/parolee's body system.

Still a further object of these inventions is to provide prisoner/parolee tracking, monitoring, warning, and learning systems and methods that monitor sounds and audible signals generated by the prisoner/parolee or in the vicinity of the prisoner/parolee, and analyze those sounds for detection of dangerous situations such as gunshots.

Yet a further object of these inventions is to provide prisoner/parolee tracking, monitoring, warning, and learning systems and methods that permit transmission of spoken commands from a prisoner/parolee control center to individual prisoners/parolees directing them to return to prescribed locations or travel patterns, and to warn those prisoners/parolees that they have violated their predetermined movement, travel, or other conditions of parole.

Still a further object of these inventions is to provide warning to the general population within areas that may be threatened by individual prisoners or parolees that have violated their prescribed travel space or behavior restrictions.

Yet another object of these inventions is to provide prisoner tracking, monitoring, warning, and learning systems and methods that make use of prisoner sensor processing units that are securely attached to the prisoner in a manner that cannot be removed without generating warning signals.

Further objects of the invention are apparent from reviewing the summary of the invention, detailed description, and claims which are set forth below.

The above and other objects are achieved by a method of monitoring and learning a subject's behavior. A first file including reference behavior data defining several classes of individuals to be monitored is created and stored in a memory of a monitoring station computer. Included within that file is data relating to at least one class to which the subject belongs. A second file including behavior data defining the subject to be monitored is also created and stored in the monitoring station computer memory. The monitoring station computer is defined and programmed with data defining a set of allowed activities for each of the several classes of individuals to be monitored. The monitoring station computer is also defined and programmed with data defining a set of allowed activities that are specific for the subject to be monitored. These allowed activities include predefined routes and times of travel in a location remote from the monitoring station computer. A remote monitoring transmitter and receiver is attached to the subject. The receiver cooperates with a satellite global positioning system to determine the subject's current location as the subject moves about in the area located remote from the monitoring station computer. Data defining the subject's location at a specific time is periodically transmitted from the remote monitoring transmitter and receiver to the monitoring station computer. The data transmitted from the remote monitoring transmitter is analyzed by the computer by comparing the data defining the subject's current location and time with the set of allowed activities that are specific for the subject. The computer determines if there are any variations from the allowed activities. A first alarm signal is generated defining any determined variation from the allowed activities. An expert system is used to further analyze the first alarm signal defining the determined variation from the allowed activities. This expert system is programmed to recognize a continuum of degrees of alarms based on a comparison of the determined variation, the behavior data defining the subject to be monitored, and the reference behavior data defining the class of individuals to which the subject belongs. The expert system also generates a second alarm signal defining a specific recommended course of action that is appropriate for the determined variation, the subject's specific behavior data, and the data defining the class of individuals to which the subject belongs. Hereafter, the phrase prisoners or parolees are used interchangeably and may just as easily be used for children, incompetent persons, or the aged.

Furthermore, the data defining the subject's current location and time, the set of allowed activities that are specific for the subject, and the second alarm signal defining the recommended course of action are more frequently analyzed. Based on this more frequent analysis, it is determined whether the second alarm condition has changed by becoming more or less critical. If necessary, the second alarm condition is modified to reflect any determined change.

The reference behavior data defining several classes of individuals to be monitored includes but is not limited to criminal behavior data, criminal history and criminal record data, parole level information, data relating to a number of different types of crimes, data relating to a defined deviated behavior standard derived, and crime probability data that compares various crime types with various location types wherein a crime probability for each of the various crime types is determined and assigned for each of the various location types. The behavior data defining the subject to be monitored includes but is not limited to criminal behavior data, criminal history and criminal record data, parole level information, and data relating to types of crimes committed by the subject. The data defining a set of allowed activities for each of the several classes of individuals to be monitored includes but is not limited to permitted travel data, permitted location data, permitted location dwell time data, and permitted travel path data.

Also, the remote monitoring transmitter and receiver has an audible alarm. A signal is transmitted from the monitoring station computer to the monitoring transmitter and receiver attached to the subject. The signal activates the audible alarm to indicate to the subject that an alarm condition has been triggered. An expert system is operated to analyze the first and second alarm conditions and the data that generated the alarm conditions. The first and second data files are modified to reflect learned activities that either should or should not generate an alarm. The expert system learns behavior that unnecessarily generated an alarm. The behavior data defining the subject to be monitored and the data defining the set of allowed activities that are specific for the subject to be monitored are accordingly modified so that the alarm is not generated in the future.

Periodic monitoring of the subject's behavior continues. After a predefined period without an alarm being generated, the data defining the set of allowed activities that are specific for the subject to be monitored is modified to provide for an increased area and longer allowed time of travel. The increase area and longer time of travel is accordingly communicated to the remote monitoring transmitter and receiver attached to the subject. After an alarm is generated, the data defining the set of allowed activities that are specific for the subject to be monitored is modified to provide for a decreased area and shorter time of travel. The decreased area and shorter allowed time of travel is accordingly communicated to the remote monitoring transmitter and receiver attached to the subject.

The remote monitoring transmitter and receiver attached to the subject is used to monitor a physical attribute of the subject. Data defining the monitored physical attribute of the subject is transmitted from the remote monitoring transmitter and receiver to the monitoring station computer. The computer analyzes the data by comparing the data defining the subject's monitored location, time and physical attributes with the set of allowed activities that are specific for the subject. The computer determines if there are any variations from these allowed activities. The physical attributes being monitored include but are not limited to speech, alcoholic levels, heart rate, breath and perspiration.

The above and other objects are also achieved by a system of monitoring and learning a subject's behavior. The system includes at least a monitoring station computer, a remote monitoring transmitter and receiver, and an expert system. The monitoring station computer creates and stores in its memory a first file including reference behavior data defining several classes of individuals to be monitored. Included within that file is data relating to at least one class to which the subject belongs. The monitoring station computer also creates and stores in its memory a second file including behavior data defining the subject to be monitored is also created and stored in the monitoring station computer memory. The monitoring station computer is defined and programmed with data defining a set of allowed activities for each of the several classes of individuals to be monitored. The monitoring station computer is also defined and programmed with data defining a set of allowed activities that are specific for the subject to be monitored. These allowed activities include predefined routes and times of travel in a location remote from the monitoring station computer. The remote monitoring transmitter and receiver is attached to the subject. The receiver cooperates with a satellite global positioning system to determine the subject's current location as the subject moves about in the area located remote from the monitoring station computer. Data defining the subject's location at a specific time is periodically transmitted from the remote monitoring transmitter and receiver to the monitoring station computer. The data transmitted from the remote monitoring transmitter is analyzed by the monitoring computer by comparing the data defining the subject's current location and time with the set of allowed activities that are specific for the subject. The monitoring computer determines if there are any variations from the allowed activities. A first alarm signal is generated by the monitoring computer defining any determined variation from the allowed activities. The expert system is used to further analyze the first alarm signal defining the determined variation from the allowed activities. This expert system is programmed to recognize a continuum of degrees of alarms based on a comparison of the determined variation, the behavior data defining the subject to be monitored, and the reference behavior data defining the class of individuals to which the subject belongs. The expert system also generates a second alarm signal defining a specific recommended course of action that is appropriate for the determined variation, the subject's specific behavior data and the data defining the class of individuals to which the subject belongs.

BRIEF DESCRIPTION OF THE DRAWINGS

The inventions of this application are better understood in conjunction with the following drawings and detailed description of the preferred embodiments. The various hardware and software elements used to carry out the inventions are illustrated in the attached drawings in the form of block diagrams, flow charts, and other appropriate pictorial representations.

FIG. 13 is a prisoner/parolee information chart which outlines information assigned to prisoners/parolees and wherein prisoner/parolee parole levels and constraints are assigned to prisoners/parolees.

FIG. 19 is a directed graph illustrating permissible prisoner/parolee travel between designated locations.

FIG. 20 is a ring/sector map useful in the disclosed prisoner/parolee tracking and monitoring system and method to define permissible geographic areas in which or through which the prisoner or parolee may travel.

FIG. 21 illustrates a prisoner or parolee travel matrix corresponding to the graph of FIG. 19 useful in defining approved destinations and locations of the prisoner or parolee being tracked and monitored.

FIG. 22 is a travel time matrix showing expected travel times for the prisoner or parolee being tracked and monitored between the various locations indicated in FIG. 19.

FIG. 23 is a location dwell time matrix showing average or maximum times (or both) that a prisoner or parolee is permitted to spend at a given location.

FIG. 24 is a ring/sector time matrix recording permissible average or maximum (or both) time intervals that a prisoner or parolee may spend in individual ring/sector segments of FIG. 22.

FIG. 29 is a graph of location types against crime types for learning aggregate prisoner's/parolee's behavior algorithm.

The above figures are better understood in connection with the following detailed description of the preferred embodiments.

DETAILED DESCRIPTION

Figure 1:
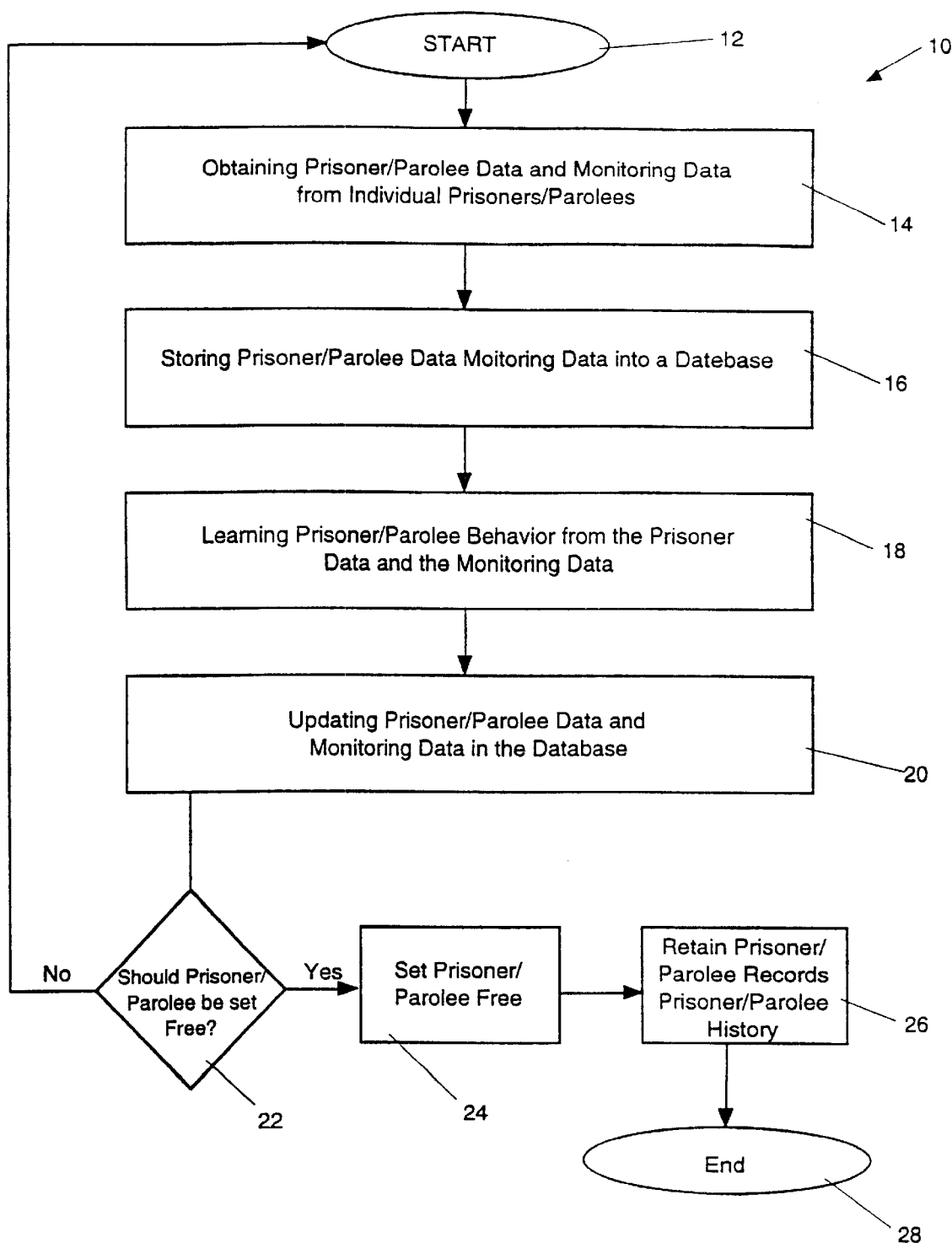
FIG. 1 is a block diagram of the overall prisoner/parolee tracking, monitoring, and learning algorithm herein disclosed.

The present invention relates to prisoner/parolee tracking, monitoring, and learning system and corresponding methods in accordance with the herein disclosed inventions. FIG. 1 shows a general algorithm 10 for the present invention. The algorithm 10 starts at block 12. At block 14, the algorithm 10 obtains prisoner/parolee data and monitoring data from individual prisoners/parolees. These data include but are not limited to reference behavior data that define several classes of individuals to be monitored, behavior data defining the subject to be monitored, and data defining a set of allowed activities for each of the several classes of individuals to be monitored. The algorithm 10 stores and updates the prisoner/ parolee data and prisoner/parolee monitoring data at block 16. Algorithm 10 moves to block 18 where the algorithm 10 learns the prisoner/parolee behavior. At block 20, the prisoner/parolee data and monitoring data in the database are updated. At block 22, the algorithm 10 determines whether the prisoner/parolee 38 should be recommended to be set free. If the prisoner/parolee 38 is not to be set free, the algorithm 10 loops back to block 14 where the prisoner/ parolee data and monitoring data from individual prisoners/ parolees 38 are further obtained. If the prisoner/parolee 38 is to be set free, then the algorithm 10 executes commands to set the prisoner/parolee 38 free at block 24. At block 26, the prisoner/parolee records are retained for the prisoner/parolee history at block 26. The algorithm 10 ends at block 28. Algorithm 10 shows that the present invention relates to an all-encompassing, broad-based system and algorithm for tracking, monitoring, learning, and reinforcing the behavior of the prisoners/parolees 38.

Figure 2:
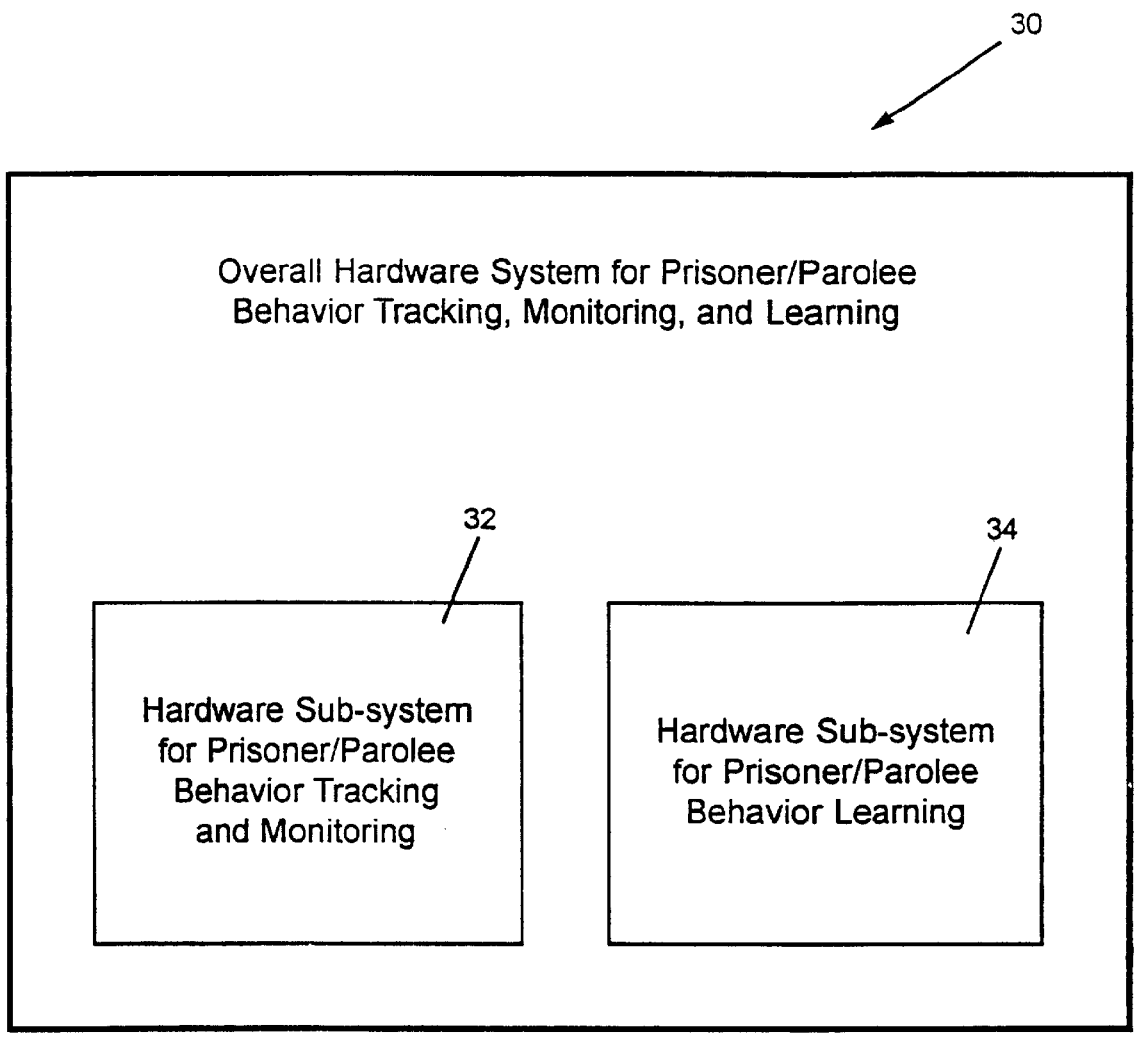
FIG. 2 is a block diagram of the overall hardware system for tracking, monitoring, and learning prisoner/parolee behavior herein disclosed showing a hardware sub-system for prisoner/parolee behavior tracking and monitoring and a hardware sub-system for prisoner/parolee behavior learning.

FIG. 2 shows an overall hardware system 30 for prisoner/parolee behavior tracking, monitoring, and learning. The overall hardware system 30 includes a hardware sub-system 32 for prisoner/parolee behavior tracking and monitoring; and a hardware sub-system 34 for prisoner/parolee behavior learning. The hardware sub-system 32 tracks and monitors individual prisoner/parolee behavior, and the hardware sub-system 34 learns the behavior of prisoners/parolees individually and on an aggregate level.

Figure 3:
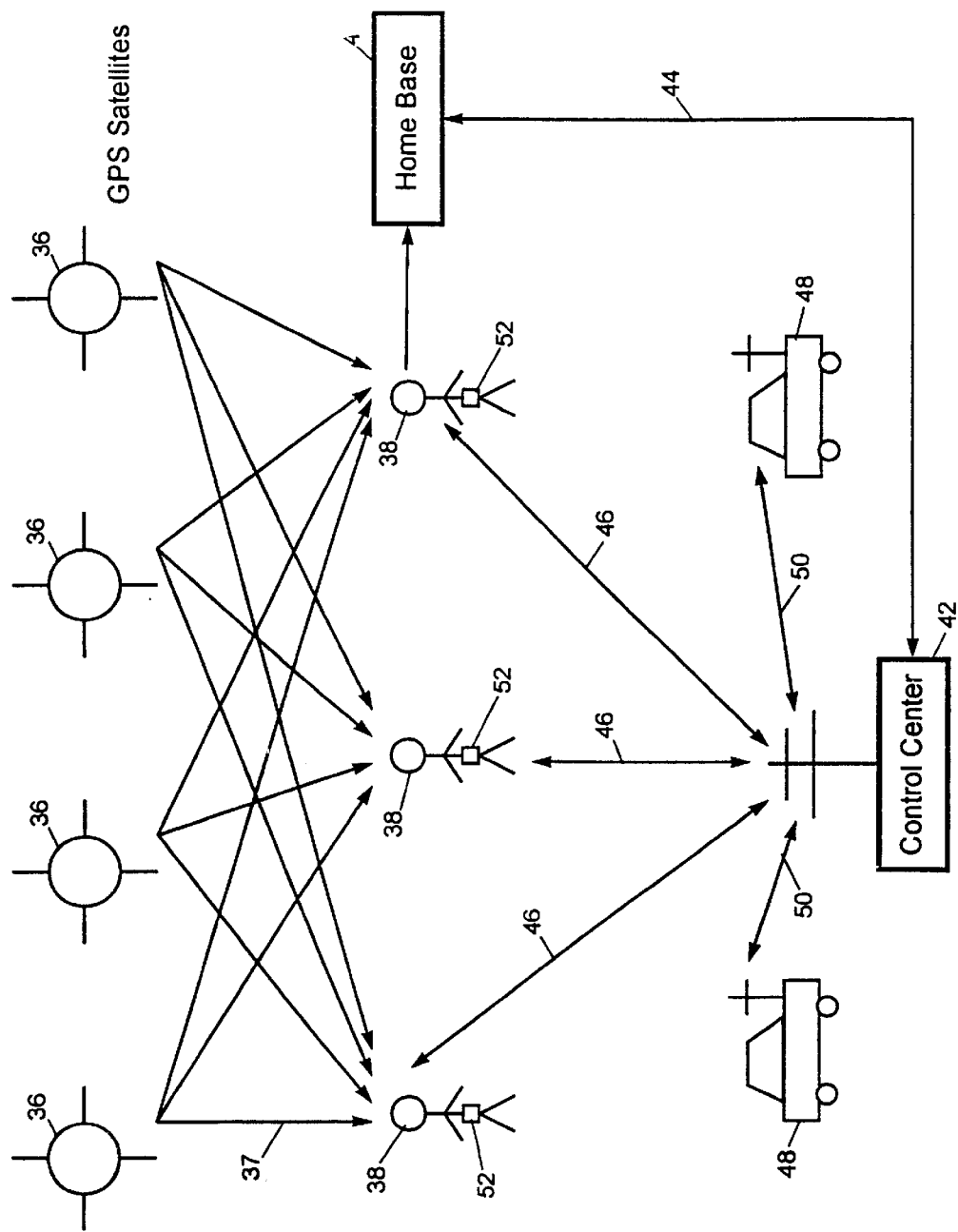
FIG. 3 is a graphical representation of the overall prisoner/parolee tracking, monitoring, and learning systems and methods herein disclosed.

FIG. 3 illustrates a prisoner/parolee tracking and monitoring system and method in accordance with the herein disclosed inventions. The system and method of FIG. 3 permits simultaneous tracking and monitoring of multiple prisoners or parolees 38. The individual prisoners/parolees 38 each have securely attached to their body a prisoner sensor/processor unit 52. The unit 52 may be attached to the arm, the leg, the waist or in any convenient manner to each prisoner/parolee 38. Such attachment is, however, secured and may only be removed by an authorized person. The prisoner or parolee sensor/processor unit 52 permits tracking the location of individual prisoners/parolees 38 as well as monitoring audio sounds, communicating with the prisoner/parolee 38 or other personnel in the vicinity of the prisoner/parolee 38, and monitoring physical conditions of the prisoner/parolee 38 including, for example, his/her heart rate, pulse, blood pressure, respiration, temperature, and chemical properties of selected body fluids such as sweat and/or breath. The unit 52 is a compact electronic system specifically designed for comprehensive monitoring, tracking, and learning of prisoners/parolees 38.

As illustrated in FIG. 3, GPS satellites 36 are used to provide continuous tracking and surveillance of the location and travel of individual prisoners/parolees 38. GPS tracking and ranging signals 37 are received via the prisoner/parolee sensor or processing units 52 which make use of known GPS calculation procedures to determine the location of individual prisoners or parolees 38. The individual prisoner/parolee sensor or processor units 52 receive signals from multiple GPS satellites 36 and make use of known triangulation calculation procedures and methods for determining prisoner/parolee locations. Such location calculations make use of precisely timed ranging signals using pseudo random (PRN) coding techniques in a known manner as described, for example, in the above referenced various GPS patents which are herein incorporated by reference.

As illustrated in FIG. 3, the prisoner/parolee sensor or processor units 52 are designed to communicate with control center 42 via radio control links 46. The control center 42 may query individual prisoners/parolees 38 for their location and travel status including records of recent travel time spent at particular locations. Parameters indicative of the travel and time spent at particular locations of individual prisoners or parolees 38 are transmitted via radio control links 46 to the control 42. Additional parameters indicative of substance abuse, such as, alcohol or drugs are also transmitted via the control links 46. Individual prisoners/parolees 38 are identified using unique identification codes which may be used to address particular prisoners or parolees 38 via the radio control links 46.

The radio control links 46 may make use of radio communications, standard cellular telephone technology, or other two-way radio communication methods to communicate with the control center 42. In addition, as illustrated in FIG. 3, the prisoner/parolee sensor or processing units 52 may communicate through home base 40 via standard telephone links 44 with the control center 42. The home base 40 would typically be the principal place of residence of the prisoner or parolee 38. The prisoner or parolee 38 may be required by legal authorities to periodically transmit the outputs of the sensor or processing unit 52 via the telephone link 44 to the control center 42. The telephonic connection may supplement or replace the radio link 46 or may be used in addition to those links 46 for periodic communication with control center 42.

Also illustrated in FIG. 3 are police or security units 48 which communicate via radio links 50 with the control center 42. Security or police personnel may be dispatched in units 48 to particular locations to check on, monitor, or apprehend prisoners or parolees 38 depending upon reported activities of those prisoners or parolees 38 through the systems and methods of FIG. 3. In addition to being used for dispatching, the two-way radio links 50 may be used by security or police personnel to report status or information pertaining to individual prisoners or parolees 38 being tracked and monitored by the systems and methods of FIG. 3.

Figure 4:
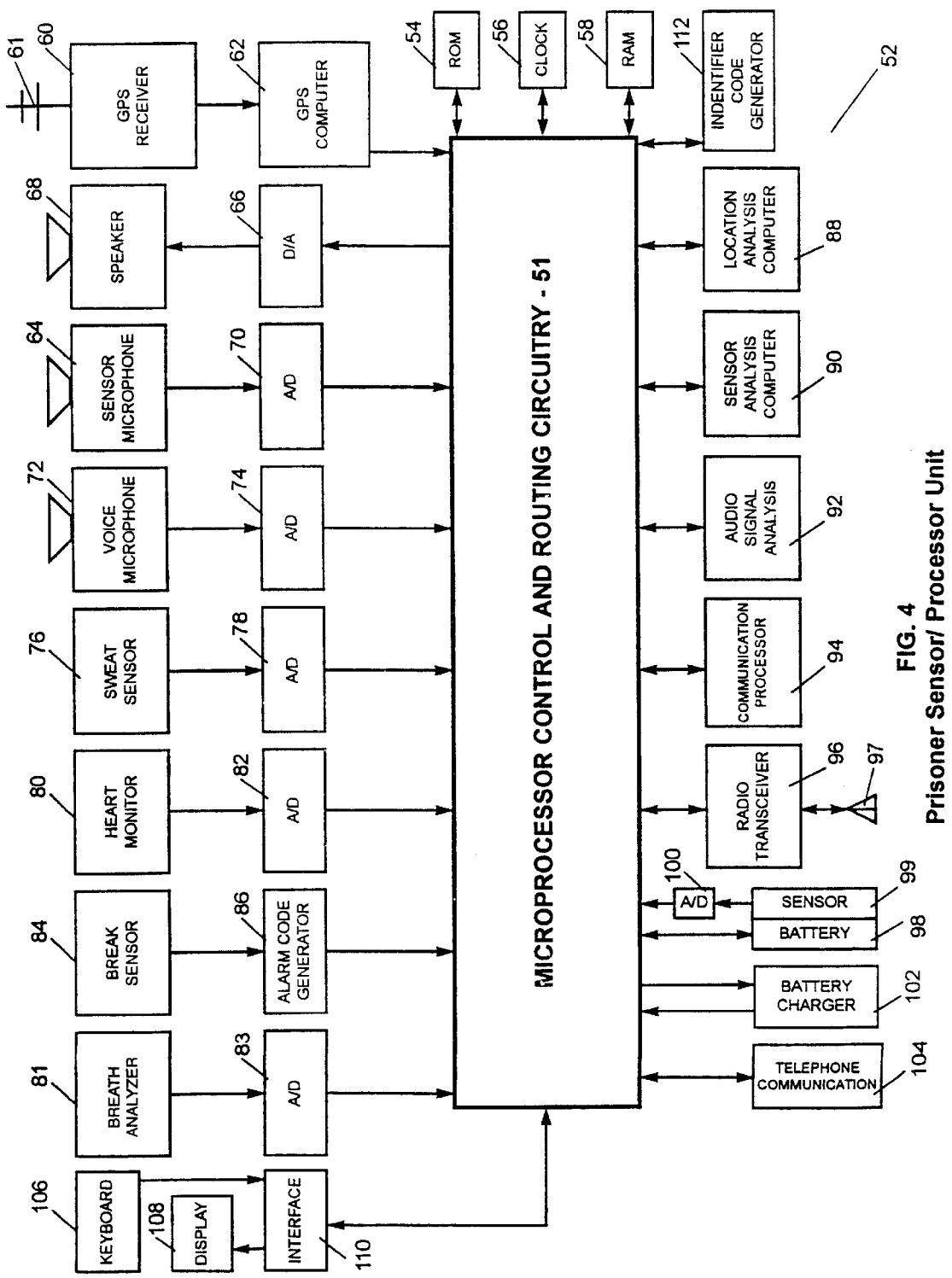
FIG. 4 is a diagram illustrating the principal elements of the prisoner/parolee sensor or processor unit to be carried on the person of the prisoner or parolee.

FIG. 4 illustrates in block diagram form a preferred embodiment of the prisoner/parolee sensor or processing unit 52 used in the inventions herein disclosed. The unit 52 of FIG. 4 is to be worn and secured to the body of the prisoner or parolee 38 to be tracked and monitored. High speed, VLSI sensor, processing, and radio transceiver electronics are used in the unit 52, resulting in a compact, lightweight portable prisoner/parolee sensor or processor unit 52 that may be comfortably worn by the person to be tracked and monitored.

The unit 52 of FIG. 4 uses microprocessor control and routing circuitry 51 to interconnect the various sensors, computing elements, and radio communication elements illustrated in the figure. The control and routing circuitry 51 includes appropriate high speed bus switching and/or matrix switching circuitry of the type well known to those skilled in the art to interconnect the various electronic elements of FIG. 4 under direction of the microprocessor controller included as part of unit 51.

The unit 51 also includes display and control interfaces attached through interface circuit 110. The display 108 may be a small LCD integrated circuit as a part of the physical sensor/processor unit 51, or may, in fact, be an external display attached to the unit 51 through an appropriate communication port in the unit. The display 108 is coupled to the unit 51 via interface circuit 10. The control keyboard 106 of FIG. 4 may likewise be individual control buttons and keys that are a physical part of the prisoner or parolee sensor/processor unit 51 or may be a more complete keyboard attached to the unit through an appropriate control interface port. The keyboard 106 is also coupled to the unit 51 via interface circuit 110. The keyboard/control unit 106, display 108, and interface 110 may be used in the initial setup of the prisoner/parolee sensor or processing unit 51 to specify particular travel and prisoner or parolee monitor parameters useful in tracking and monitoring the prisoner or parolee 38.

FIG. 4 also illustrates a telephonic communication port 104 for coupling of the prisoner/parolee sensor or processor unit 52 to standard telephone lines for communication with a remote control center 42. The telephonic communication port 104 may be used both for loading control and monitor parameters into the memory units of the prisoner/parolee sensor or processor unit 52 and for querying the unit 52 for the purpose of obtaining prisoner or parolee travel and monitoring parameters collected by unit 52 for use at the remote prisoner or parolee tracking and monitoring center 42 of FIG. 3. In addition to the telephonic port 104, the radio transceiver 96 with its associated antenna 97 may be used for communication with the remote prisoner or parolee tracking and monitoring control center 42 of FIG. 3. The radio transceiver 96 may likewise be used for both setting of control and monitor parameters in the unit 52 and for querying unit 52 for tracking and monitoring resulting data.

The microprocessor and control routing circuitry 51 is attached to read only memory (ROM) 54 for permanent storage of control programs and/or data. The unit 52 also includes random access memory (RAM) 58 useful in execution of programs and collection of data by the prisoner/parolee sensor or processor unit 52. The clock unit 56 provides time references and time stamp data to be recorded with prisoner or parolee travel and monitoring parameters. The clock 56 is useful for indicating a time of occurrence of particular events, the duration of events such as travel times, and the time that a particular prisoner or parolee 38 spends or dwells at a particular location. Such parameters are useful in controlling the travel of the prisoner or parolee 38 in the manner described below.

The prisoner/parolee sensor or processor unit 52 of FIG. 4 also includes a battery 98 for powering of the unit 52 and its associated circuitry. A sensor 99 is used to monitor the charge remaining on the battery 98 and is coupled through analog to digital converter 100 to the microprocessor control and routing circuitry 51. The sensor 99 enables a person to determine when the battery unit 98 must be replaced or recharged. The output of the sensor 99 may be communicated via the radio transceiver 96 or telephone communications port 104 to the central control center 42 at prescribed intervals to indicate the status of the battery charge for individual parolees or prisoners 38. In addition, a battery charger 102 is included which is used to recharge the battery 98 under instructions from the parolee or prisoner 38 or on command from the central control center 42.

The prisoner/parolee sensor or processor unit 52 also includes an identifier code generator 112 used to generate unique identification codes for individual prisoners or parolees 38 being tracked and monitored. The specific identification code is appended to communications between the prisoner/parolee sensor or processor unit 52 and the central control center 42 to identify and associate all communications and data files between the unit 52 and the central control center 42. The identifier code generator 112 is also used to address individual prisoner/parolee sensor or processor units 52 from the central control center 42, permitting selective polling of individual prisoner or parolee units 52 for the purpose of changing control and monitor parameters within the unit 52 and for querying the unit 52 for location, travel, and monitor parameters.

The prisoner/parolee sensor or processor unit 52 of FIG. 4 includes GPS receiver 60 coupled to GPS computer 62. The receiver 60 and computer 62 are used to receive signals from multiple GPS satellites 36 for calculation of the location of the prisoner or parolee 38 being tracked by the unit 52. The receiver 60 receives signals from multiple GPS satellites 36 via antenna 61 as shown in FIGS. 3 and 4, with transmission of received GPS ranging codes to GPS computer 62 for analysis. GPS computer 62 makes use of standard and known triangulation calculation methods to precisely determine the location of the prisoner or parolee 38 being tracked. The outputs of GPS computer 62 are used to report the location of the prisoner or parolee 38 being tracked and also to report the route of travel of that prisoner or parolee 38 at specified time intervals or at particular times under command of the location analysis computer 88.

Coordinate locations from the GPS computer 62 are fed to the location analysis computer 88 for further analysis and recording of prisoner or parolee location and travel routes. The location analysis computer 88 is used to compare the location and travel route coordinates and times to pre-stored, permitted travel routes and location dwell times to insure that the prisoner or parolee 38 is only traveling to permitted locations at specified times and staying at those locations for allowed periods. In addition to comparison to pre-stored time and travel parameters, the location analysis computer 88 may implement expert system algorithms designed to learn travel and dwell times of a given prisoner or parolee 38 in determining deviations of prisoner/parolee behavior from normal or expected individual travel and dwell time parameters. For example, using the location analysis computer 88, the prisoner/parolee sensor or processor unit 52 may "learn" prisoner or parolee behavior patterns useful in tracking and monitoring individual prisoner or parolees 38. Such expected behavior useful in generating notations or warning/control signals to be used in a manner further described below.

The prisoner/parolee sensor or processor unit 52 also includes a speaker 68 attached to the unit 51 via digital to analog converter 66 for transmission of commands or inquiries to the prisoner or parolee 38 being tracked. The speaker 68 may also be used to sound audible alarms to those in the vicinity of the prisoner or parolee 38 that may be deemed to be in danger or in a situation wherein they should be made aware of the presence of the prisoner or parolee 38 being tracked and monitored. In addition to the speaker 68, a sensor microphone 64 coupled to the unit 51 via analog to digital converter 70 is used to permit audio feedback from the prisoner or parolee 38 and also to sense audio signals in the vicinity of the prisoner or parolee 38. The sensor microphone 64 may be useful, for example, in hearing gunshots, shouting, fighting, or other audible signals indicative of violent behavior. The sensor microphone 64 may also be used to record conversations between the prisoner/parolee 38 and other persons. Such recording is useful, for example, in assuring that the prisoner/parolee 38 does not engage in unauthorized activity such as drug dealing, plotting of criminal activities, or other prohibited activities.

A voice microphone 72 coupled to unit 51 via analog to digital converter 74 Is also provided to further allow communication with the prisoner or parolee 38 or with other persons such as law enforcement agents or persons that may be in danger because of the presence of the prisoner or parolee 38. For example, police personnel may use the voice microphone 72 for direct communications with the control center 42 to indicate apprehension of a given prisoner or parolee 38. Circumstances of such apprehension may also be transmitted via voice microphone 72, permitting dispatch of additional police personnel or other assistance as may be appropriate for a given situation. Audio inputs from the sensor microphone 64 and voice microphone 72 may be analyzed in the audio signal analysis unit 92 of FIG. 4. Such analysis permits automatic speaker recognition to be certain that the person speaking or wearing the prisoner/parolee sensor or processor unit 52 is indeed the prisoner or parolee 38 being tracked and monitored. Audio signal analysis unit 92 may also be used to recognize spoken commands or responses from the prisoner or parolee 38 and to recognize particular sounds such as gunshots, shouting, fighting, etc. Depending on sound level sensitivity, the microphones 64 and 72 may be integrated with appropriate circuitry into a single microphone unit.

Also illustrated in FIG. 4 are heart monitor 80 and sweat sensor 76 coupled to unit 51 respectively through analog to digital converters 82 and 78. These physical monitors permit select sensing of the prisoner or parolee physical parameters useful in the tracking and warning system herein disclosed. For example, the heart monitor 80 may be used to indicate an excited state or condition that may be associated with crime or other unauthorized activity. Sweat sensor 76 may be used to detect the presence of drugs in the manner to be described below, permitting the monitoring of substance abuse by the prisoner or parolee 38. Combining such monitoring with precise location information as determined via GPS receiver 60 and GPS computer 62 permits dispatching of police or other personnel to the location of a particular prisoner or parolee 38 that may be engaged in illegal or unauthorized activity such as the use of drugs, alcohol, etc. In addition to the heart monitor 80 and sweat sensor 76 illustrated in FIG. 4, other physiological body parameter monitoring may be implemented including, for example, the use of breath analyzers that are on command from the central control center 42 to determine the presence of alcohol.

The prisoner/parolee sensor or processor unit 52 illustrated in FIG. 4 includes a break sensor 84 with an alarm code generator 86 used to report any attempt by the prisoner or parolee 38 to remove the prisoner/parolee sensor or processor unit 52 from his or her body. The unit 52 is attached to the prisoner or parolee 38 with a strap. The break sensor 84 is configured to permit sensing of removal of the unit 52 by, for example, cutting of the strap or otherwise interrupting the physical integrity of the attachment mechanism to the prisoner or parolee 38 being tracked and monitored.

Communication processor 94 of FIG. 4 is used to coordinate communications with the central control and monitoring station 42 via the telephone port 104 and/or radio transceiver 96. Communication processor 94 both receives messages from the central control center 42 and formats and transmits messages to that center 42. Communication processor 94 may be used to coordinate both voice and data communications using the various computer and sensor devices described above. In addition, the communication processor 94 has access to identification code generator 112 and clock 56 via microprocessor control and routing circuitry 51 for appending identification codes and time stamps to messages transmitted to the remote control center 42.

Figure 5:
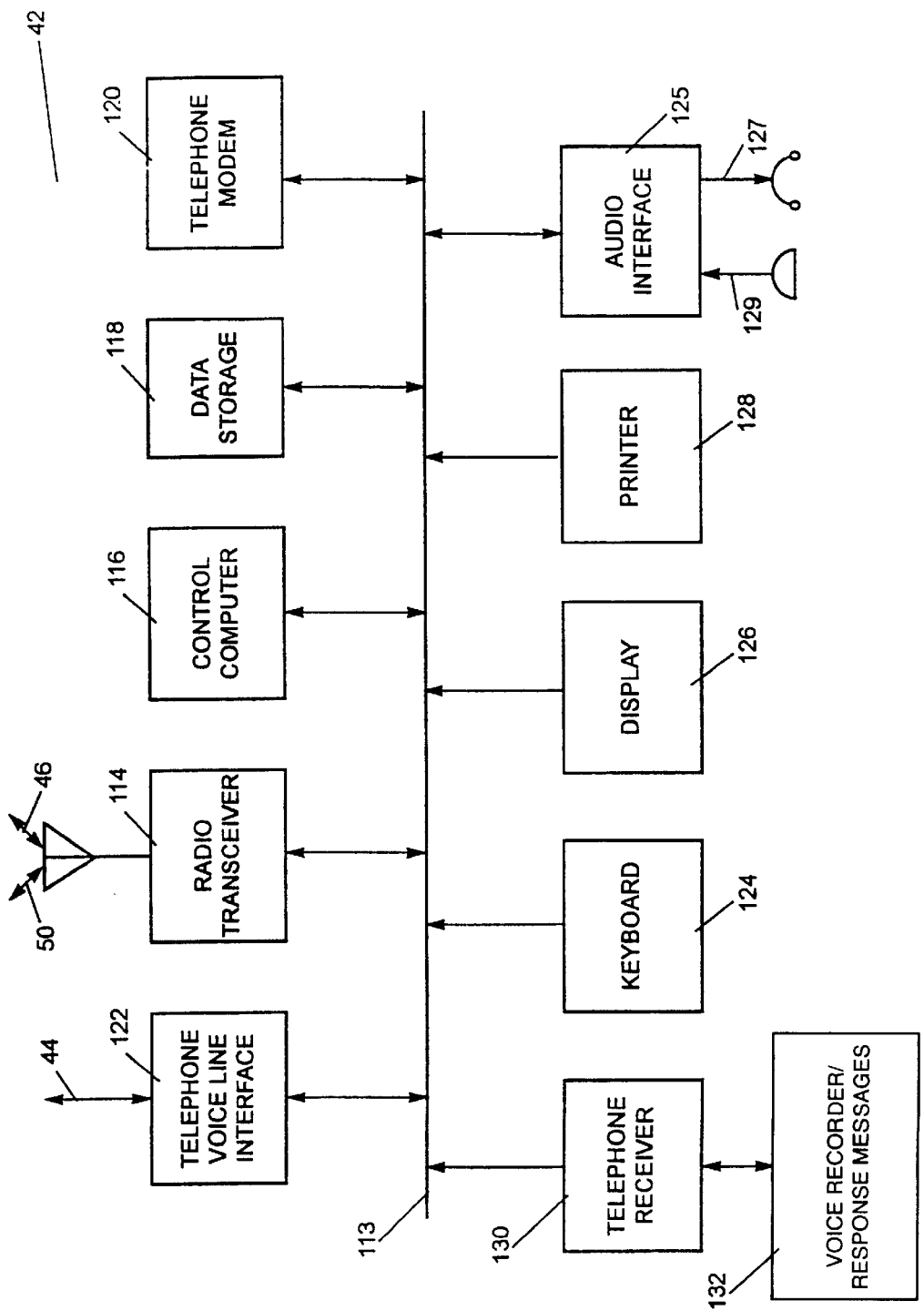
FIG. 5 is a diagram illustrating the principal elements of the prisoner/parolee control center used to maintain databases and receive information from prisoners or parolees being tracked and monitored.

FIG. 5 illustrates the configuration of the prisoner or parolee control center 42 of FIG. 3. As illustrated in FIG. 3, the prisoner/parolee control center 42 is used to communicate with the individual prisoners or parolees 38 as well as with police and security personnel and vehicles 48 via the indicated radio control links 50. In addition, telephonic couplers 44 may be coupled to the control center 42 from the homebase of individual prisoners or parolees 38. As shown in FIG. 5, the prisoner/parolee control center 42 includes a telephone line interface 122 coupled to telephonic coupler 44. In addition, a radio transceiver 114 is used for communication with individual prisoners or parolees 38 via radio control links 46 and 50. The telephonic interface 122 and radio transceiver interface 114 are coupled to the local prisoner or parolee control center computer and control equipment of the control center 42 via the interface bus or switching mechanism 113. In addition to the telephonic voice line interface 122, the control center 42 permits data communication via telephone modem 120 also interfaced with switching bus 113 as shown in FIG. 5. Audio interface 125 permits direct communication with prisoner or parolee control center operating personnel via microphone 129 and earphones 127. This configuration enables operating personnel to communicate directly with police and security personnel via radio transceiver 114 and radio links 50 and also to communicate with parolees or personnel via the telephone interface 44 or radio links 46 as illustrated in FIGS. 3 and 5. In addition, the audio interface 125 permits prisoner or parolee control center operating personnel to "listen in" via sensor microphone 64 and/or voice microphone 72 of FIG. 4 to sounds and/or to speakers in the vicinity of individual prisoners or parolees 38 for the purpose of hearing conversations or other audible sounds such as gunshots, shouting, fighting, etc. that may indicate an emergency or dangerous situation. As indicated in FIG. 5, a voice recorder unit 132 is also provided as part of the prisoner or parolee control center 42 and is interfaced to switching control bus 113 via telephone receiver 130. The voice recorder 132 may be used to record individual voice messages and also to provide voice response messages such as audible messages to security personnel in response to inquiries from such personnel via radio links 50 of FIG. 3.

Prisoner or parolee control center operating personnel interface to the control center communication and computing apparatus via the keyboard 124, display 126, and printer 128. These interfaces, together with the above describe audio interfaces, provide prisoner or parolee control center operating personnel complete access to voice and data communications to and from prisoners or parolees 38 and to and from security personnel using the techniques and methods of FIGS. 3 and 4 described above.

Also shown in FIG. 5 is the prisoner or parolee control center control computer 116 and its associated data storage 118. The control computer 116 is used to collect data from individual prisoners/parolees 38 indicative of their locations, travels, and the time intervals associated with such travels, or periods spent at individual locations. The computer control center 116 is able to compare such data to authorized travel and time data for each individual prisoner or parolee 38. Based on these comparisons, warning signals may be generated to alert prisoner or parolee control center operators of violations of authorized movements by the prisoner/parolee 38. Indications of substance abuse received from individual prisoners/parolees 38 via the apparatus and methods described above are also collected via computer control 116 for storage in data storage unit 118 with subsequent indication to prisoner or parolee control center operating personnel of prisoner or parolee violations so that appropriate action may be taken. Additionally, the prisoner or parolee control center control computer 116 accesses prisoner or parolee data and prisoner or parolee monitoring data, and the computer 116 learns the prisoners' or parolees' behaviors from the data.

Figure 6:
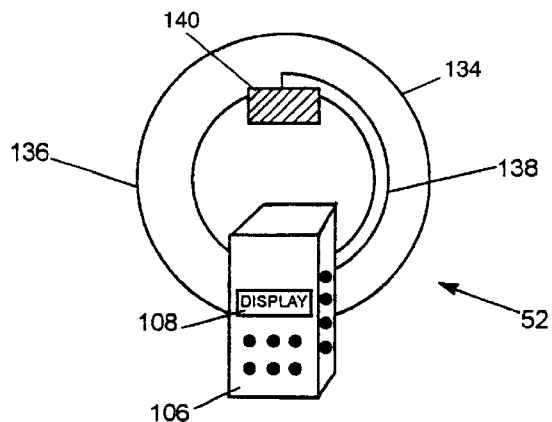
FIG. 6 is an illustration of the prisoner/parolee sensor or processor unit including a drug detection device attached to a strap wherein the strap attaches the device to the prisoner or parolee being tracked and monitored.

FIG. 6 is a pictorial representation of the prisoner/parolee sensor or processor unit 52 of FIG. 4 showing a display 108 and keyboard/control buttons 106. The various communication ports are indicated on the side of unit 52. In addition, strap 134 is illustrated in FIG. 6 and is used to attach the prisoner/parolee sensor or processor unit 52 to an arm, leg, or the torso of the prisoner or parolee 38 being tracked and monitored. The strap 134 includes a drug or substance abuse detector 140 which makes direct contact with the skin of the prisoner/parolee sensor or processor unit 52 via wire 138. The strap 134 is designed such that any attempt to disconnect or remove the prisoner/parolee sensor or processor unit 52 from the prisoner or parolee 38 will result in an alarm signal generated by break sensor 84 and alarm code generator 86 shown in FIG. 4 and discussed above. Upon activation of the break sensor 84, a tranquilizing substance may be automatically injected into the prisoner/parolee 38 to give authorities time to apprehend the prisoner/parolee 38 and inspect, repair, or replace the damaged prisoner/parolee sensor or processor unit 52.

Figure 7:
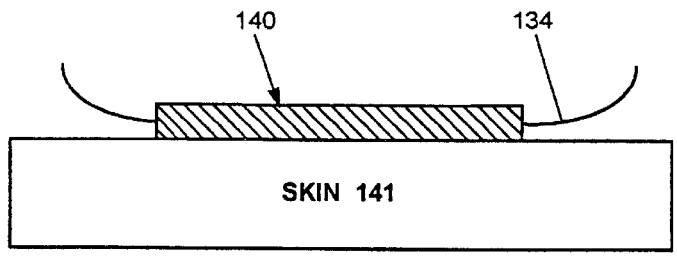
FIG. 7 illustrates the attachment of a drug/substance detector to the prisoner/parolee drug detection device strap so that the detector is in contact with the skin of the prisoner/parolee being tracked and monitored.
Figure 8:
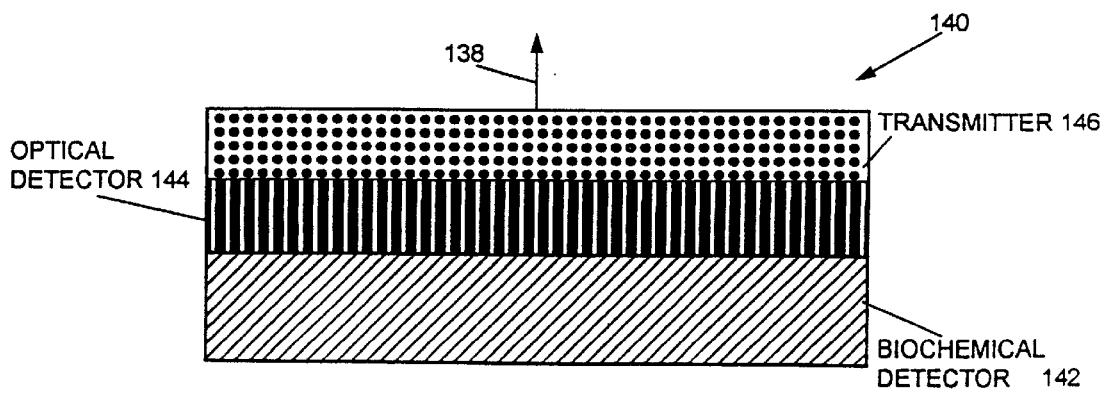
FIG. 8 illustrates a more detailed cross-section of the drug/substance detector of FIG. 6.

FIG. 7 illustrates the sensor 140 in contact with the skin 141 of the prisoner or parolee 38. The strap 134 attaches the detector 140 to the sensor/processor unit 52 as illustrated in FIG. 6. The sensor 140 is of a type known in the art that is worn in a manner so that it is in direct contact with the skin 141 as illustrated in FIGS. 7 and 8. The sensor 140 permits detection of such substances as methampheamine, morphine, tetrahydrocannabinol (THC) and cocaine. The sensor 140 is responsive to the presence of chemicals indicative of the substances of the sweat or perspiration of the person 38 wearing the detector. Such known devices are called Remote Biochemical Assay Telemetering System (R-BATS), or "drug badges" and are conceived for monitoring convicted drug users on probation. A drug badge of this type is described, for example, in the May 1996 issue of NASA Technical briefs in an article entitled "Devices Would Detect Drugs in Sweat", incorporated herein by reference. The device described in that article comprise three principal components as indicated in FIG. 8. The bar biochemical detector 142 absorbs sweat from the wearer (i.e. prisoner/parolee 38). The sweat is filtered through a membrane that will pass only smaller molecules such as those of drugs, water, or salt. The optical detector 144 uses photoelectric sensors. Florescent labels are attached to the drug molecules and are irradiated resulting in florescence that are able to be sensed by the optical or photo detector 144. The transmitter 146 of FIG. 8 transmits an indication of such molecules to the prisoner/parolee sensor or processing unit 52 via wire 138 as indicated in FIGS. 6 and 8 above. Using this detection technology in connection with GPS system, the tracking system and method herein disclosed enables not only notifying officials of substance abuse, but also providing location information permitting apprehension of the abuser.

Figure 9:
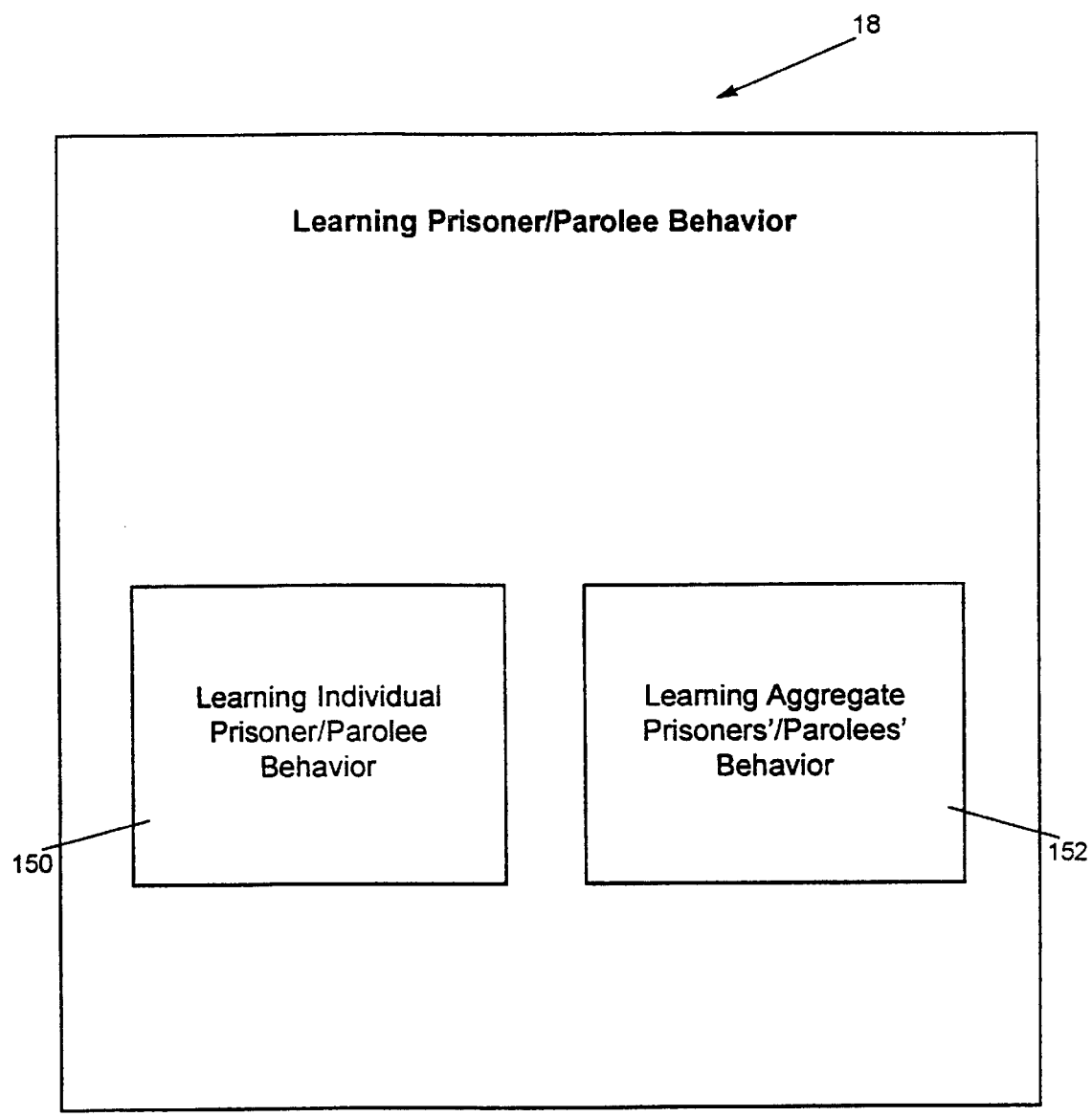
FIG. 9 is a general block diagram of the learning prisoner/ parolee behavior aspect of the present invention.

Referring to FIG. 1, the general algorithm or method 10 comprises block 14 with the operation of obtaining prisoner or parolee data and monitoring data from individual prisoners/parolees 38, block 16 with the act of storing prisoner or parolee data and monitoring data into a database, block 18 with the act of learning prisoner or parolee behavior, and block 20 with the act of updating the prisoner or parolee data and monitoring data in the database. The learning prisoner or parolee behavior block 18 is divided into two further general blocks: the learning individual prisoner/parolee behavior block 150 and the learning aggregate prisoner/parolee behavior block 152 as shown in FIG. 9.

More specifically as to the general implementation, the method 10 involves monitoring and learning a subject's behavior. This method 10 includes creating and storing in a memory of a monitoring station computer 116 a first file including reference behavior data defining several classes of individuals 38 to be monitored, including at least one class to which the subject 38 belongs. The method 10 also involves creating and storing in the monitoring station computer memory 118 a second file including behavior data defining the subject 38 to be monitored, and the method 10 defines and programs the monitoring station computer 116 with data defining a set of allowed activities for each of the several classes of individuals 38 to be monitored. The monitoring station computer 116 is defined and programmed with data defining a set of allowed activities that are specific for the subject 38 to be monitored, wherein the allowed activities include predefined routes and times of travel in a location remote from the monitoring station computer 116.

A remote monitoring transmitter and receiver 52 is attached to the subject 38, wherein the receiver cooperates with a satellite global positioning system 36 to determine the subject's current location as the subject 38 moves about in the area located remote from the monitoring station computer 116. Data defining the subject's location at a specific time is periodically transmitted from the remote monitoring transmitter and receiver 52 to the monitoring station computer 116. The data transmitted from the remote monitoring transmitter is computer analyzed by comparing the data defining the subject's current location and time with the set of allowed activities that are specific for the subject 38 and determining if there are any variations from the allowed activities. A first alarm signal defining any determined variation from the allowed activities is generated, and the first alarm signal defining the determined variation from the allowed activities is further analyzed using an expert system programmed to recognize a continuum of degrees of alarms based on a comparison of the determined variation, the behavior data defining the subject to be monitored, and the reference behavior data defining the class of individuals 38 to which the subject 38 belongs. A second alarm signal defining a specific recommended course of action that is appropriate for the determined variation, the subject's specific behavior data, and the data defining the class of individuals to which the subject belongs, is generated from the expert system.

Figure 10:
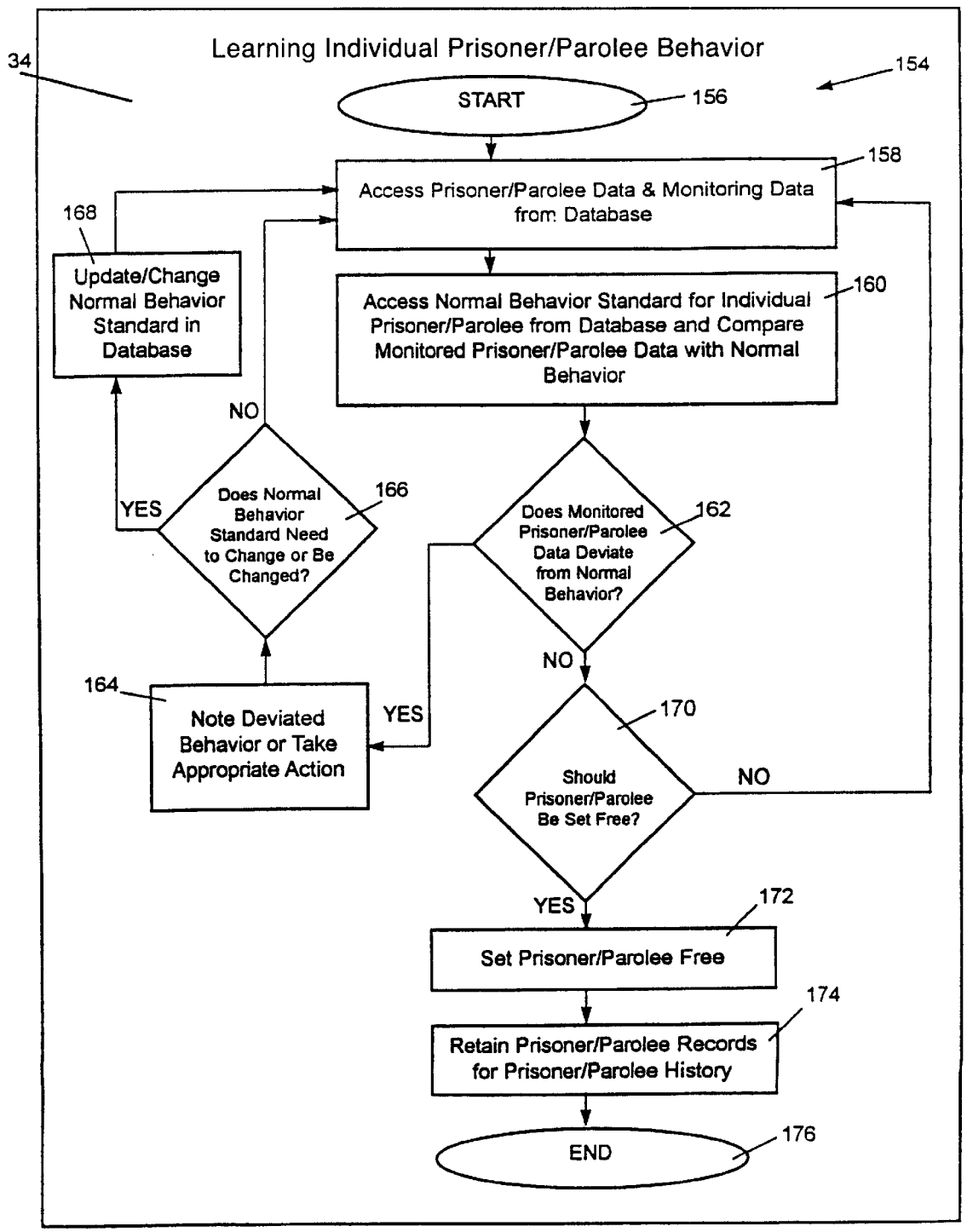
FIG. 10 is a block diagram of a specific algorithm for learning individual prisoner/parolee behavior.

A number of algorithms or methods for learning individual prisoner/parolee behavior exist, and any suitable algorithm may be used in conjunction with the present invention. FIG. 10 shows a general example algorithm 154 for learning individual prisoner/parolee behavior. Algorithm 154 starts at block 156. At block 158, the algorithm 154 accesses prisoner/parolee data and prisoner/parolee monitoring data from the database. The algorithm 154 moves to block 160 where the normal behavior standard for individual prisoners/parolees 38 is accessed from the database and the monitored prisoner/parolee data is compared with the normal behavior standard.

At block 162, the algorithm 154 determines whether the monitored prisoner/parolee data deviates from normal behavior. If there is deviation in behavior at block 162, then the deviated behavior is noted and/or appropriate action is taken at block 164. The algorithm 154 moves to decision block 166 where it is determined whether the normal behavior standard for the prisoner/parolee needs to be changed or updated. If the normal behavior standard needs to be changed, then the algorithm 154 moves to block 168 where the normal behavior standard in the database is updated and changed and then loops back to block 158 where the prisoner/parolee data and monitoring data from the database is accessed. If the normal behavior standard does not need to be changed, then the algorithm 154 loops directly back to block 158 where the prisoner/parolee data and monitoring data from the database is accessed.

If there is no deviation in behavior at block 162, then the algorithm 154 moves to decision block 170 where it is determined whether the prisoner/parolee 38 should be set free. If the prisoner/parolee 38 is not to be set free, then the algorithm 154 loops back to block 158 where the prisoner/parolee data and monitoring data from the database is again accessed. If the prisoner/parolee 38 is to be set free, the algorithm 154 moves to block 172 where the prisoner/parolee is set free and to block 174 where the algorithm 154 retains the prisoner/parolee records for each prisoner's/parolee's criminal record or history. The algorithm 154 ends at block 176.

Figure 11:
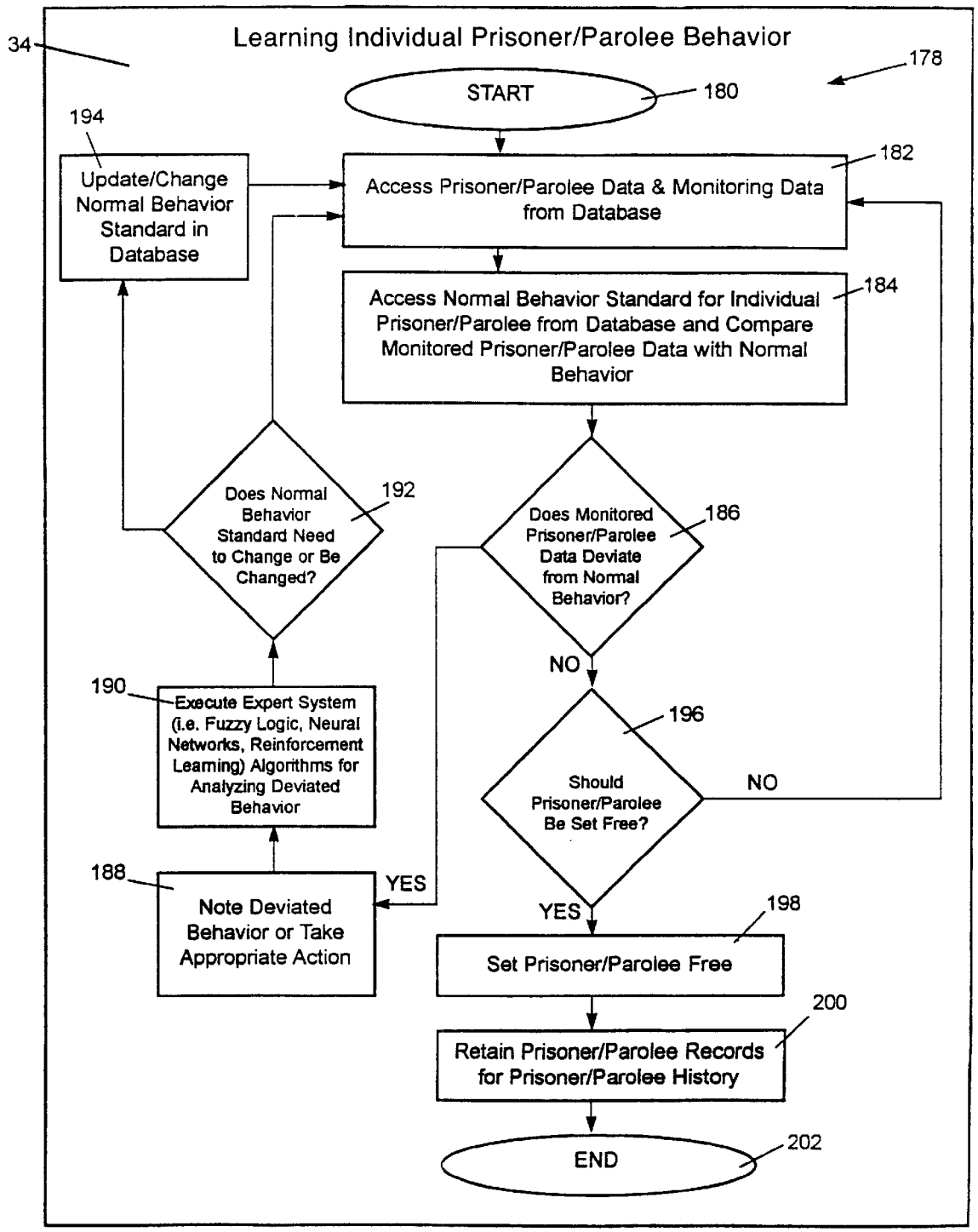
FIG. 11 is a modified version of block diagram of FIG. 10 including use of an expert system (i.e. fuzzy logic, neural networks, reinforcement learning, etc.).

FIG. 11 shows an example algorithm 178 for learning individual prisoner/parolee behavior wherein the algorithm 178 uses an expert system(s). The algorithm 178 starts at block 180. At block 182, the algorithm 178 accesses prisoner/parolee data and prisoner/parolee monitoring data from the database. The algorithm 178 moves to block 184 where the normal behavior standard for individual prisoners/parolees is accessed from the database and the monitored prisoner/parolee data is compared with the normal behavior standard.

At block 186, the algorithm 178 determines whether the monitored prisoner/parolee data deviated from normal behavior. If there is a deviation in behavior at block 186, then the deviated behavior is noted or appropriate action is taken at block 188. The algorithm 178 moves to block 190 where an expert system (i.e. including but not limited to fuzzy logic, neural networks, reinforcement learning, etc.) algorithm(s) is executed for analyzing the deviated behavior. The algorithm 178 moves to decision block 192 where it is determined whether the normal behavior standard for the prisoner/parolee needs to be changed or updated. If the normal behavior standard needs to be changed or updated, then the algorithm 178 moves to block 194 where the normal behavior standard in the database is updated and changed, and the algorithm 178 then proceeds back to block 182 where the prisoner/parolee data and monitoring data from the database is accessed. If the normal behavior standard does not need to be changed or updated, then the algorithm 178 loops directly back to block 182 where the prisoner/parolee data and monitoring data from the database is accessed.

If there is no deviation in behavior at block 186, then the algorithm 178 moves to decision block 196 where it is determined whether the prisoner/parolee 38 should be recommended to be set free. If the prisoner/parolee 38 is not to be set free, then the algorithm 178 loops back to block 182 where the prisoner/parolee data and monitoring data from the database is again accessed. If the prisoner/parolee 38 is to be set free, the algorithm 178 moves to block 198 where the prisoner/parolee 38 is set free and to block 200 where the algorithm 178 retains the prisoner/parolee records for each prisoner's/parolee's criminal record or history. The algorithm 178 ends at block 202.

The above algorithm illustrates that the behavior data defining the subject 38 to be monitored and learned includes but is not limited to criminal behavior data, criminal history and criminal record data, parole level information, and data relating to types of crimes committed by the subject 38.

Figure 12:
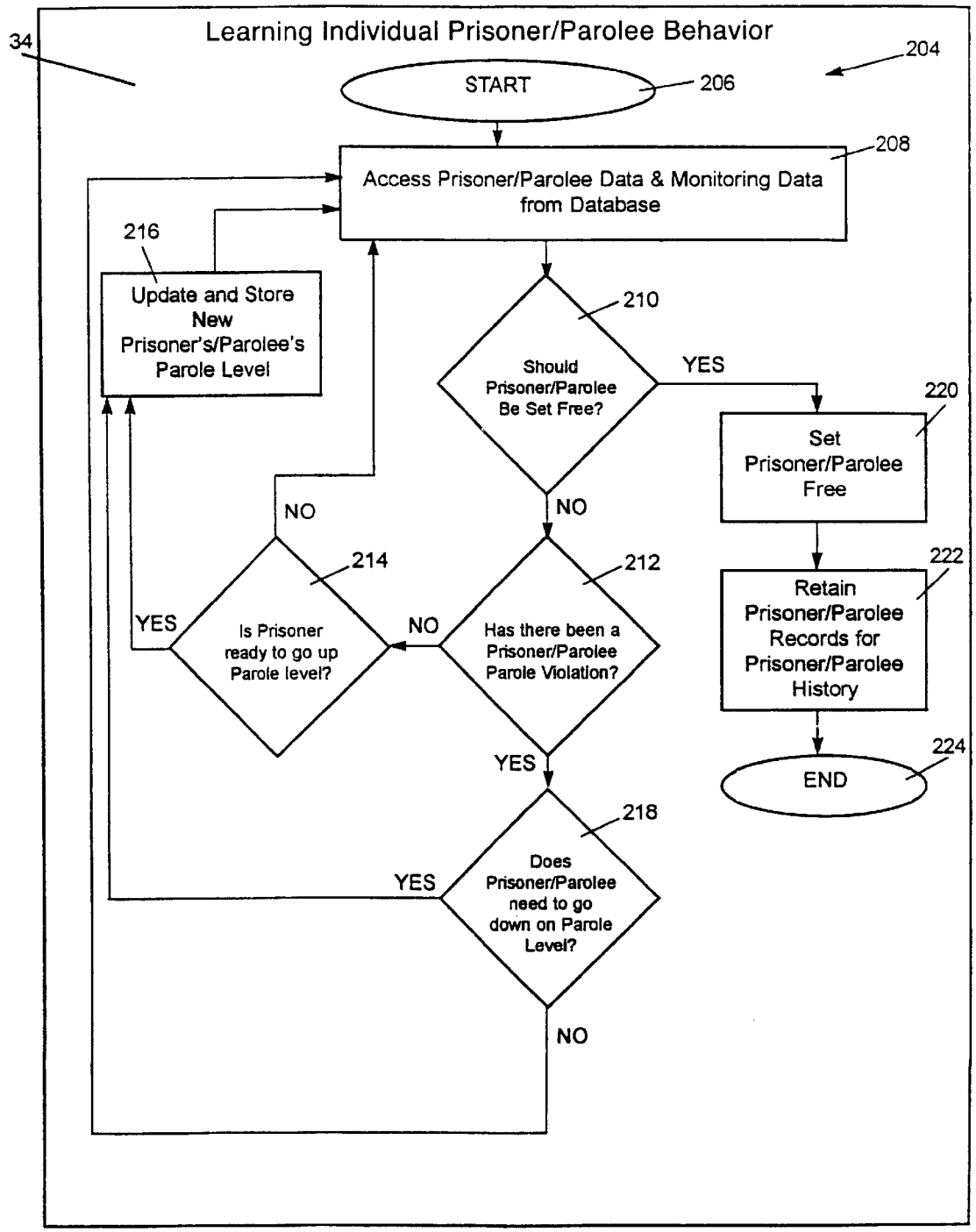
FIG. 12 is a block diagram for determining a prisoner/ parolee violation and a corresponding parole level for an individual prisoner/parolee.
Figure 14:
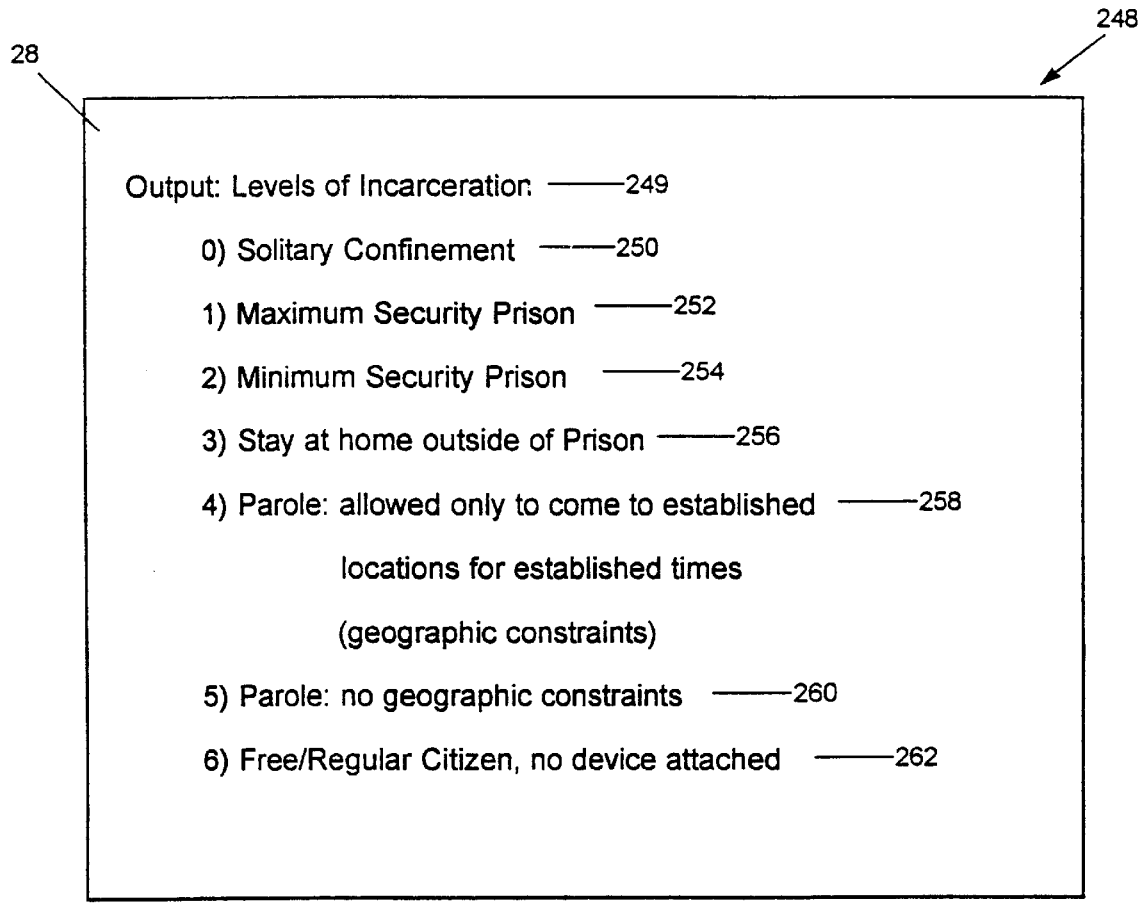
FIG. 14 is a chart showing prisoner/parolee parole level definitions.

FIGS. 12–14 illustrate a parole level example for learning individual prisoner/parolee behavior. FIG. 1 shows the algorithm 204 for the parole level example. The algorithm 204 starts at block 206. The algorithm 204 moves to block 208 where the prisoner/parolee data and prisoner/parolee monitoring data is accessed from the database. FIG. 13 shows a chart 226 with prisoner/parolee data and prisoner/parolee monitoring, data assigned to various prisoners/parolee that are stored in the database. The data includes but is not limited to the prisoner/parolee identification 228, the prisoner's/parolee's background 230, criminal history and record 232, prisoner/parolee constraints 234 (i.e. further including but not limited to allowed locations 236, prohibited locations 238, paths of travel 240, dwell times for various locations 242, etc.), current parole level 244, monitoring data 246 (i.e. including but not limited to physical and physiological parameters, current location information, etc.). The database stores and holds all of the prisoner/parolee data and prisoner/parolee monitoring data in the database for each prisoner/parolee (i.e. prisoner/parolee 1, prisoner/parolee 2, prisoner/parolee 3, etc.) as shown in FIG. 13. The algorithm 204 then moves to decision block 210 where it is determined whether the prisoner/parolee should be set free.

If the prisoner/parolee is to be set free, then the algorithm 204 moves to block 220 where the prisoner/parolee is set free. The algorithm 204 moves to block 222 where the algorithm 204 retains the prisoner/parolee records for each prisoner's/parolee's criminal record or history. The algorithm 204 then ends at block 224.

If the prisoner/parolee 38 is not to be set free, then the algorithm 204 moves to decision block 212 where it is determined whether a prisoner/parolee parole violation has occurred. If a violation has not occurred, then the algorithm 204 moves to decision block 214 where it is determined whether the prisoner/parolee 38 is ready to be moved up a parole level. If the prisoner/parolee 38 is not ready to be moved up a parole level, then the algorithm 204 loops back to block 208 where the prisoner/parolee data and monitoring data from the database is again accessed. On the other hand, if the prisoner/parolee 38 is ready to be moved up a parole level, then the algorithm 204 moves to block 216 where the database is updated and stored with the prisoner's/parolee's new parole level. The algorithm 204 then loops back to block 208 where the prisoner/parolee data and prisoner/parolee monitoring data is accessed from the database.

The parole levels referred to above may be defined in many different ways. Examples of general definitions of various parole levels 249 are shown in the chart 248 of FIG. 14. FIG. 14 shows the parole levels 249 from solitary confinement to freedom. FIG. 14 defines the various parole levels as follows: 1) The zero (0) level of parole 250 is defined as "solitary confinement"; 2) The first($1^{st}$) level of parole 252 is defined as "maximum security prison"; 3) The second($2^{nd}$) level of parole 254 is defined as "minimum security prison"; 4) The third($3^{rd}$) level of parole 256 is defined as "stay at home outside of prison"; 5) The fourth ($4^{th}$) level of parole 258 is defined as "parole" wherein the prison is allowed only to roam to established locations for established times."; 6) The fifth($5^{th}$) level of parole 260 is defined as "parole" wherein there are no geographic constraints; 7) The sixth($6^{th}$) level of parole 262 is defined as "freedom/regular citizen" wherein there are no restrictions at all.

Returning to the algorithm 204, at block 212, if a violation has occurred, then the algorithm 204 moves to block 218 where it is determined whether the prisoner/parolee 38 needs to be moved down a parole level. If the prisoner/parolee status does not need to be moved down a parole level, then the algorithm 204 loops back to block 208 where the prisoner/parolee data and monitoring data from the database is again accessed. However, if the prisoner/parolee status needs to be moved down a parole level, then the algorithm 204 moves to block 216 where the database is updated and stored with the prisoner's/parolee's new parole level. The algorithm 204 then loops back to block 208 where the prisoner/parolee data and prisoner/parolee monitoring data is accessed from the database.

In the general example of implementation, the method and system of monitoring and learning a subject's behavior further includes more frequently analyzing the data defining the subject's current location and time, the set of allowed activities that are specific for the subject and the second alarm signal defining the recommended course of action, determining whether the second alarm condition has changed by becoming more or less critical, and if necessary, modifying the second alarm condition to reflect any determined change. The method and system further comprises the act of updating the data defining the allowed activities that are specific to the subject to include data defining the behavior of the monitored subject that caused the issuance of the alarm. Also, the method and system further comprises the act of when the second alarm has been modified by becoming less critical, modifying the data defining the allowed behavior of the monitored subject to define the activity.

Also, the remote monitoring transmitter and receiver has an audible alarm, and a signal is transmitted from the monitoring station computer to the monitoring transmitter and receiver attached to the subject, which signal activates the audible alarm to indicate to the subject that an alarm condition has been triggered. An expert system is operated to analyze the first and second alarm conditions and the data that generated the alarm conditions, and the first and second data files are modified to reflect learned activities that either should or should not generate an alarm. The expert system learns behavior that unnecessarily generated an alarm. The behavior data defining the subject to be monitored and the data defining the set of allowed activities that are specific for the subject to be monitored are accordingly modified so that the alarm is not generated in the future.

The method and system of monitoring and learning a subject's behavior further include the acts of and the implementation of systems for continuing to periodically monitor the subject's behavior, and after a predefined period without an alarm being generated, modifying the data defining the set of allowed activities that are specific for the subject to be monitored to provide for an increased area and longer allowed time of travel. The increase area and longer time of travel is accordingly communicated to the remote monitoring transmitter and receiver attached to the subject. Also, the method and system of monitoring and learning a subject's behavior further include the acts of and the implementation of systems for continuing to periodically monitor the subject's behavior, and after an alarm is generated, modifying the data defining the set of allowed activities that are specific for the subject to be monitored to provide for a decreased area and shorter time of travel. The decreased area and shorter allowed time of travel is accordingly communicated to the remote monitoring transmitter and receiver attached to the subject.

The method and system of monitoring and learning a subject's behavior further include the acts of and implementation of systems for using the remote monitoring transmitter and receiver attached to the subject to monitor a physical attribute of the subject, transmitting data defining the monitored physical attribute of the subject from the remote monitoring transmitter and receiver to the monitoring station computer, and wherein computer analyzing the data includes comparing the data defining the subject's monitored location, time and physical attributes with the set of allowed activities that are specific for the subject and determining if there are any variations from the allowed activities. The physical attributes being monitored include but are not limited to speech, alcoholic levels, heart rate, breath and perspiration. The remote monitoring transmitter and receiver 52 includes an audible alarm, and the method and system further comprises the act of transmitting a signal from the monitoring station computer 116 to the monitoring transmitter and receiver 52 attached to the subject 38, which signal activates the audible alarm to indicate to the subject 38 that an alarm condition has been triggered.

Figure 15:
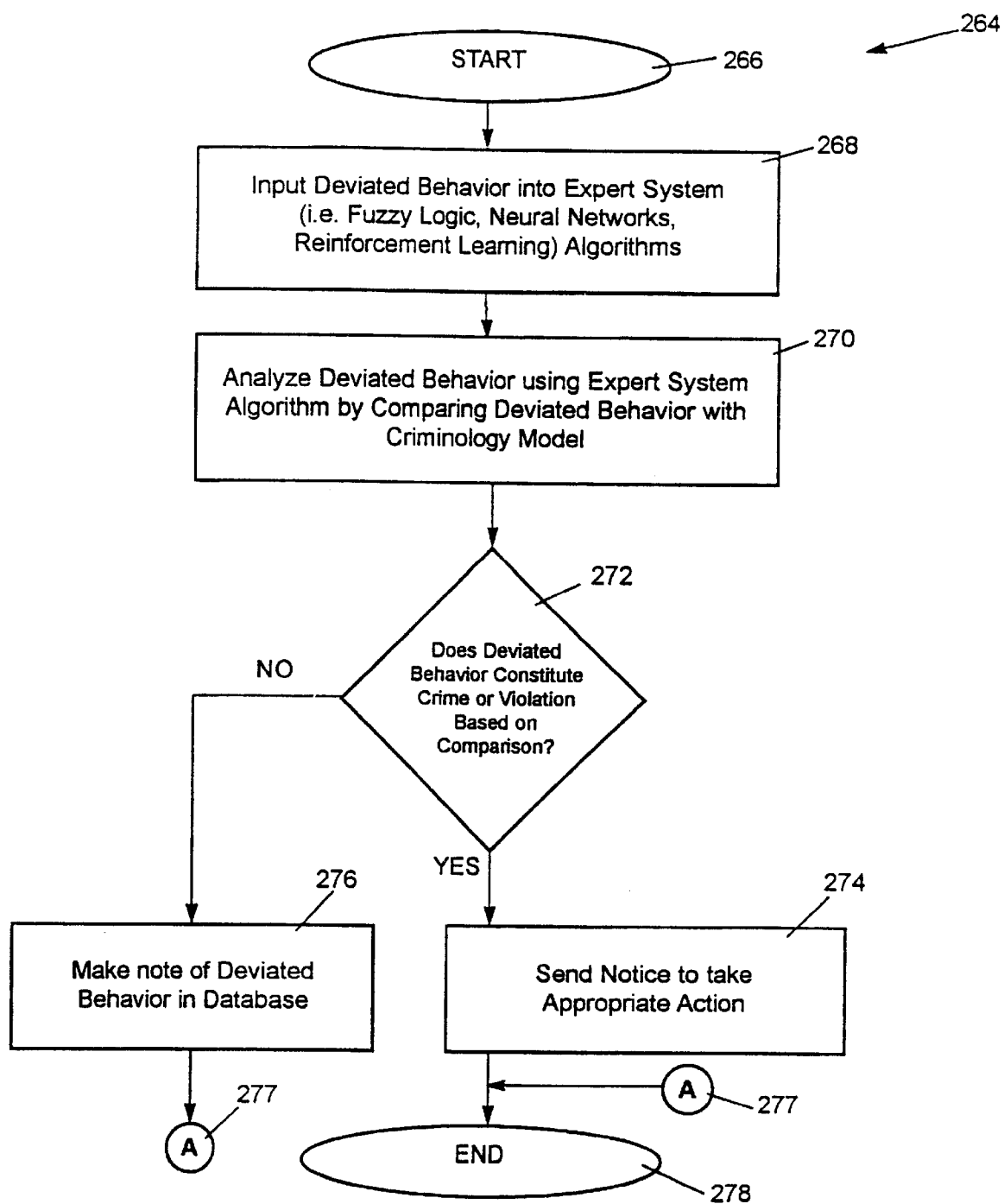
FIG. 15 is a block diagram of an expert system algorithm that is used for determining whether deviated behavior constitutes a crime or violation.

FIG. 15 shows a learning individual prisoner behavior algorithm 264 that uses an expert system and a criminology model. The algorithm 264 starts at block 266. The algorithm 264 moves to block 268 where the deviated behavior is inputted into the expert system (i.e. including but not limited to fuzzy logic, neural networks, reinforcement learning, etc.). The algorithm 264 moves to block 270 where the deviated behavior is analyzed using expert system algorithms by comparing deviated behavior with the criminology behavior.

At decision block 272, it is determined whether the deviated behavior constitutes a crime or violation based on the comparison. If the deviated behavior does not constitute a crime or violation, then the deviated behavior is made note of in the database at block 276, and the algorithm 272 ends at block 278 via connector A 277. If the deviated behavior does constitute a crime or violation, then algorithm 264 sends notice or notices to take appropriate action(s) at block 274. The algorithm 264 then ends at block 278.

A number of algorithms or methods for learning aggregate prisoner/parolee behavior exist, and any suitable algorithm may be used in conjunction with the present invention.

Figure 16:
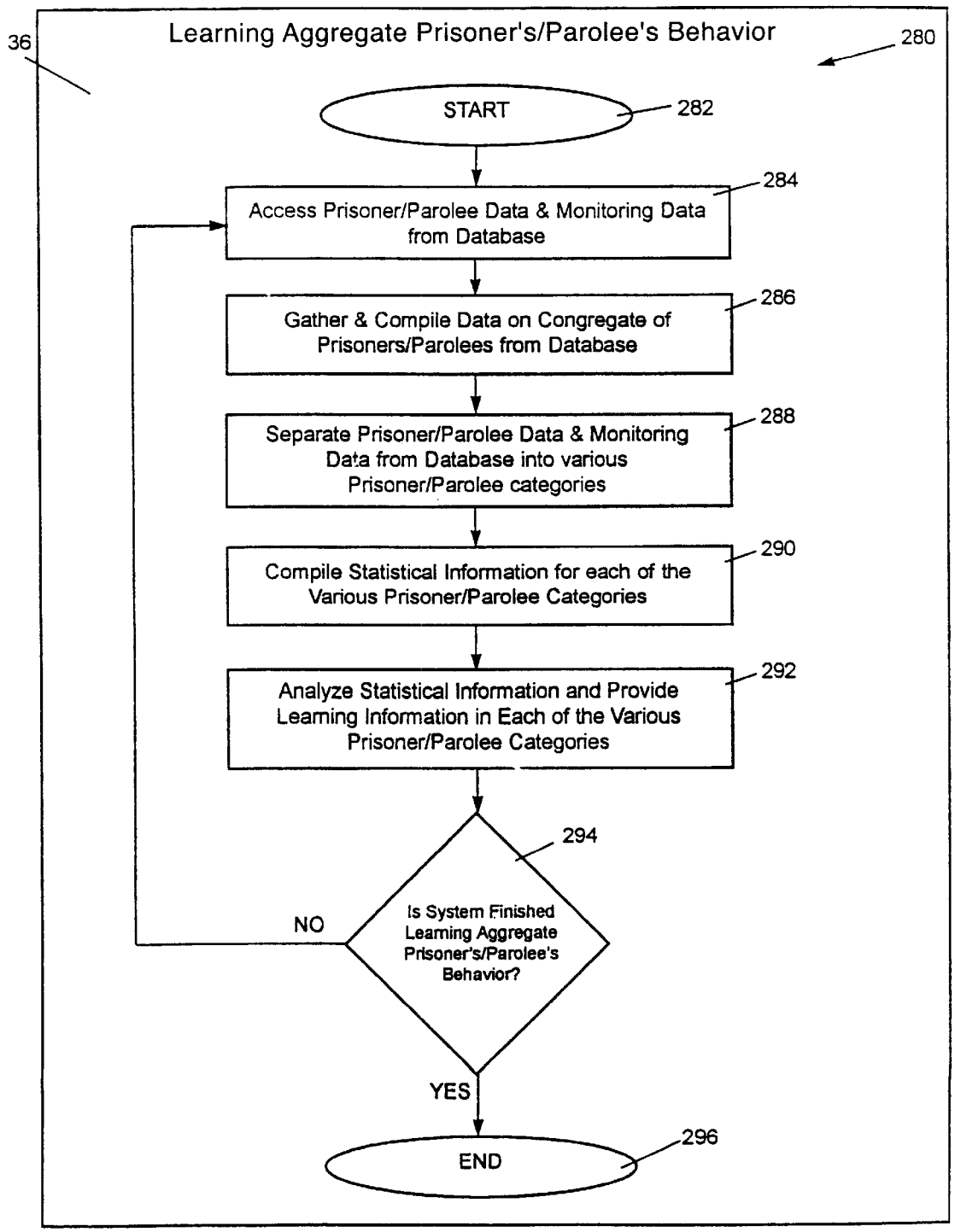
FIG. 16 is an algorithm for learning an aggregate number of prisoners'/parolees' behavior wherein data on a congregate of prisoners/parolees from the database are gathered and compiled and wherein the data are analyzed and sorted into various prisoner/parolee categories.

FIG. 16 shows a general example algorithm 280 for learning aggregate prisoner or parolee behavior. Algorithm 280 starts at block 282. At block 284, the algorithm 280 accesses prisoner or parolee data and prisoner or parolee monitoring data from the database. The algorithm 280 moves to block 286 where the data on a congregate of prisoners/parolees 38 from the database is gathered and compiled. At block 288, the prisoner/parolee data and monitoring data from the database are separated into various prisoner/parolee categories. The algorithm 280 then moves to block 290 where statistical information for each of the various prisoner/parolee categories is compiled. The algorithm 280 goes to block 292 where the statistical information is analyzed and learning information in each of the various prisoner/parolee categories is provided. At decision block 294, the algorithm 280 determines whether the system is finished learning aggregate prisoner's/parolee's behavior. If the system is not finished with learning aggregate prisoner's/parolee's behavior, then the algorithm 280 loops back to block 284 where the prisoner/parolee data and prisoner/parolee monitoring data from the database is accessed. If the system is finished with learning aggregate prisoner's/parolee's behavior, then the algorithm 280 moves to block 296 where the algorithm 280 ends.

Figure 17:
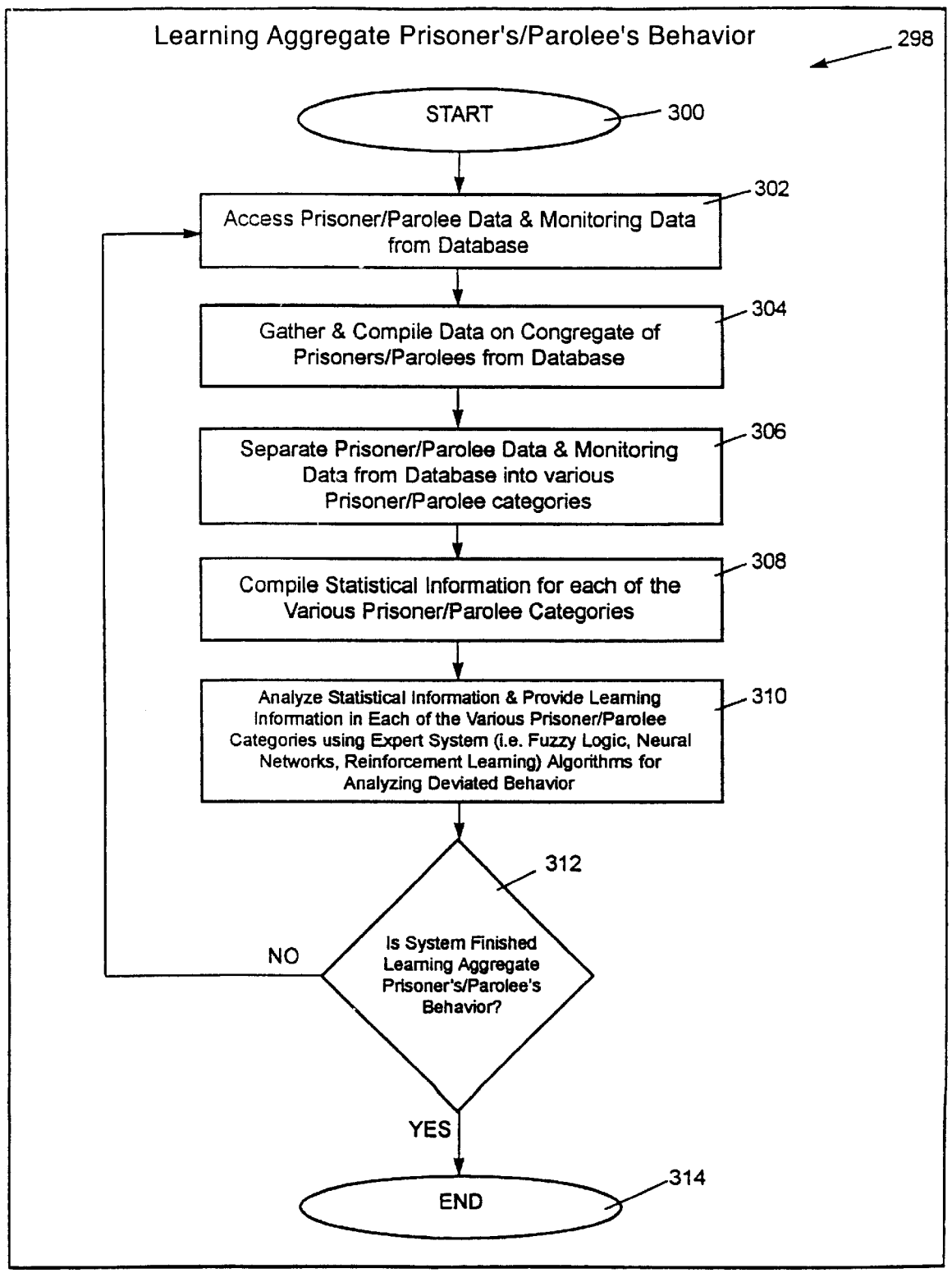
FIG. 17 is an algorithm for learning an aggregate number of prisoners'/parolees' behavior that further includes the act of analyzing statistical information and providing learning information in each of the various prisoner/parolee categories using expert system (i.e. fuzzy logic, neural networks, reinforcement learning, etc.) algorithms for analyzing deviated behavior.

FIG. 17 shows an example algorithm 298 for learning aggregate prisoner/parolee behavior wherein the algorithm 298 uses an expert system(s). The algorithm 298 starts at block 300. At block 302, the algorithm 298 accesses prisoner or parolee data and prisoner or parolee monitoring data from the database. The algorithm 298 moves to block 304 where the data on a congregate/aggregate of prisoners or parolees 38 from the database is gathered and compiled. At block 306, the prisoner/parolee data and monitoring data from the database are separated into various prisoner/parolee categories. The algorithm 298 then moves to block 308 where statistical information for each of the various prisoner/parolee categories is compiled. The algorithm 298 goes to block 310 wherein using expert system(i.e. fuzzy logic, neural networks, reinforcement learning, etc.) algorithms for analyzing deviated behavior, statistical information is analyzed and learning information in each of the various prisoner/parolee categories is provided. At decision block 312, the algorithm 298 determines whether the system is finished learning aggregate prisoner's/parolee's behavior. If the system is not yet finished with learning aggregate prisoner's/parolee's behavior, then the algorithm 298 loops back to block 302 where the prisoner/parolee data and prisoner/parolee monitoring data from the database is accessed. If the system is finished with learning aggregate prisoner's/parolee's behavior, then the algorithm 298 moves to block 314 where the algorithm 298 ends.

Figure 18:
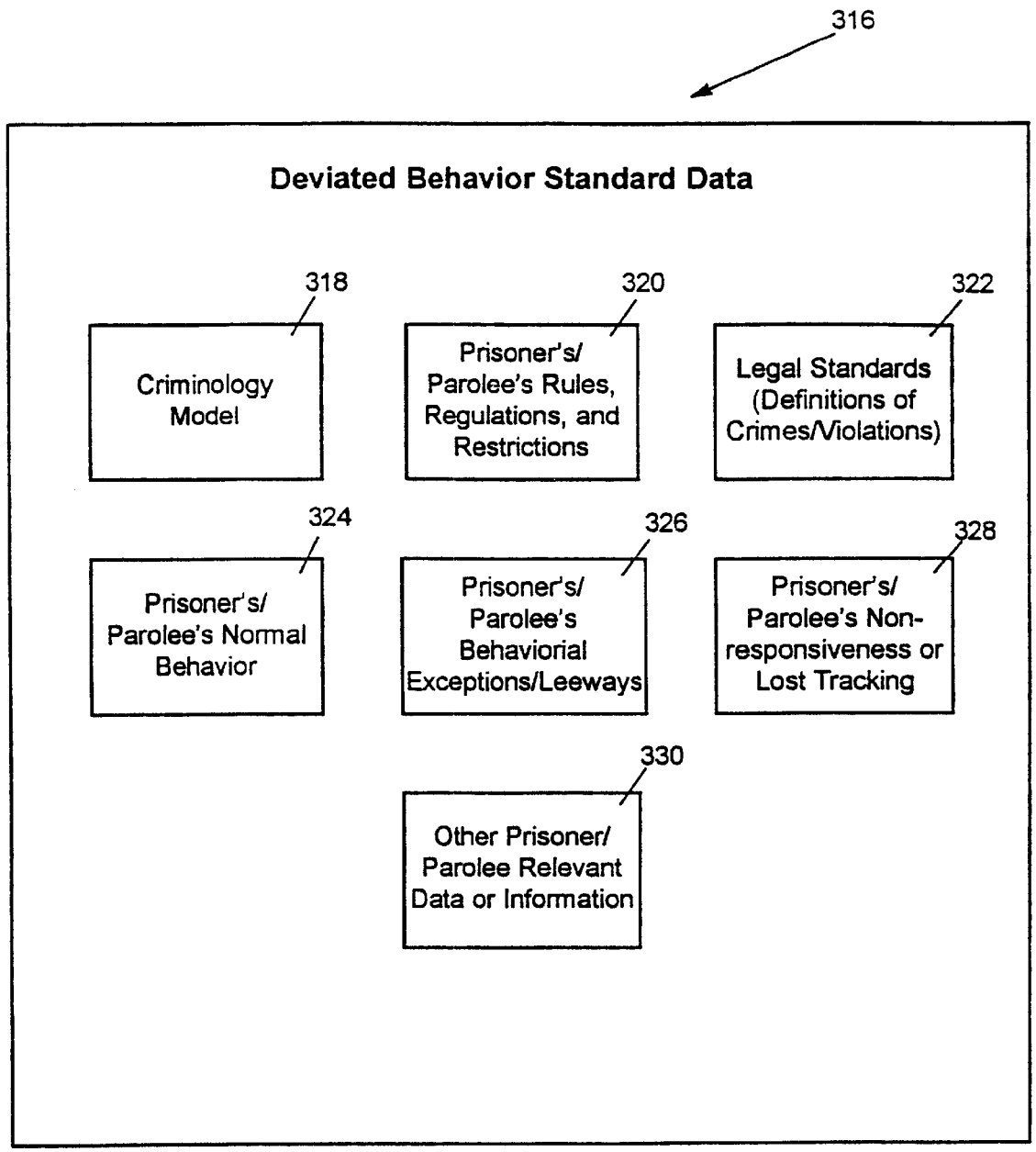
FIG. 18 is a block diagram of deviated behavior standard data that defines the deviated behavior standard for prisoners/parolees.

The data for learning aggregate prisoner/parolee behavior algorithms 280 and 298 that determines the standard for deviated behavior is able to be defined by various sources and models. FIG. 18 shows a general chart 316 for the deviated behavior standard data. The general chart 316 has within in it various other sub-blocks. The general chart 316 includes but is not limited to criminology model block 318; a prisoner's/parolee's rules, regulations, restrictions block 320; a legal standards(Definition of Crimes/Violations) block 322; a prisoner's/parolee's normal behavior block 324; a prisoner's or parolee's behavior/exceptions/leeway's block 326; prisoner's/parolee's non-responsiveness/lost tracking block 328; and other prisoner/parolee relevant data or information block 330.

The above algorithms illustrate that the reference behavior data defining several classes of individuals 38 to be monitored includes but is not limited to criminal behavior data, criminal history and criminal record data, parole level information, data relating to a number of different types of crimes, data relating to a defined deviated behavior standard derived, and crime probability data that compares various crime types with various location types wherein a crime probability for each of the various crime types is determined and assigned for each of the various location types.

In the general example of implementation, the method and system includes the acts of operating an expert system to analyze the first and second alarm conditions and the data that generated the alarm conditions and modifying the first and second data files to reflect learned activities that either should or should not generate an alarm. In operating the expert system, the method and system further involve the acts of using a criminology model to which the determined variation from the allowed activities is compared, determining whether the variation from the allowed activities constitutes a crime based on the comparison, recording the variation from the allowed activities into the second file of the monitoring station computer memory 118, and recommending any necessary appropriate action responsive to the determination of the variation from the allowed activities.

The method and system also involves the acts of operating an expert system to learn behavior that unnecessarily generated an alarm and modifying the behavior data defining the subject to be monitored. Furthermore, the method and system further involves the acts of operating an expert system to learn behavior that unnecessarily generated an alarm and modifying the data defining the set of allowed activities that are specific for the subject to be monitored so that the alarm is not generated in the future.

The following example illustrates the defining of constraints, rules, regulations, and restrictions for prisoners/parolees 38, and the tracking, monitoring, and learning of deviated behavior from the constraints for the prisoners/parolees 38.

Turning now to the tracking of prisoner/parolee movements, FIG. 19 presents an example digraph illustrating the permitted travel of an individual prisoner or parolee 38. Location A 334 is the home base or place of residence of the prisoner/parolee 38. The prisoner/parolee 38 in this example is authorized to travel to five other locations labeled B 336, C 338, D 340, E 342, and F 344. For example, location C 338 may be the prisoner's/parolee's place of work. Location B 336 may be a grocery store, and location D 340 may be a service station where the prisoner/parolee 38 may be permitted to travel to obtain gasoline and service for his or her automobile. Locations E 342 and F 344 may be permitted locations where the prisoner/parolee 38 may visit or stay for a period of time. Not only are the particular locations of the prisoner or parolee 38 limited to those shown in FIG. 19, but also the paths of travel are limited to those indicated by directional arrows of FIG. 19. For example, the prisoner/parolee 38 may travel from locations A 334 to D 340 only by passing through location B 336. From location D 340, the person may only return to location B 336 or travel to location E 342. Restricting locations and paths of travel provides a high degree of control over the activities of the prisoner/parolee 38 being tracked or monitored.

FIG. 21 illustrates in matrix 348 the possible rights of travel depicted in the person's travel graph of FIG. 19. The rows and columns of the prisoner/parolee travel matrix 348 correspond to the location indications in FIG. 19. A "1" indicates direct travel from the node corresponding to the row is permitted to the node corresponding to the column. For example, bidirectional travel is permitted between node A 334 and B 336 with "1" in the corresponding locations in the prisoner/parolee travel matrix 348 of FIG. 21. Similarly, travel is permitted between locations D 340 and E 342, indicated by the corresponding entries of "1" in the prisoner/parolee travel matrix. Prohibited direct travel between nodes A 334 and D 340 is indicated by the presence of a "0" in the prisoner/parolee travel matrix 348. The matrix 348 is a convenient way of storing permissible travel routes in a digital computer. Deviation from the travel routes represents violation of the permitted route of the prisoner/parolee 38 being tracked and monitored.

FIG. 22 illustrates a travel time matrix 350 with permitted or average travel time recorded between the various nodes between which the prisoner/parolee 38 may travel as indicated by the prisoner/parolee travel matrix 348 in FIG. 21. The travel time may be indicated, for example, in minutes, and represent maximum or average travel times. For example, in the travel time matrix 350 of FIG. 22, the travel time from A 334 to F 344 and from F 344 to A 334 has been indicated as 20 minutes. Multiple travel time matrices of the type illustrated in FIG. 22 may be used to indicate different travel times, such as the minimum time, average time, and the maximum time. In this way, a time limit can be specified that will always result in an alarm being generated when exceeded. At the same time, an "average" time matrix will permit a continual updating of travel time on a daily basis corresponding to actual prisoner/parolee's travel times. In fact, the system is capable of "learning" expected travel times (i.e. using the learning algorithms in FIGS. 9–12 and 15–17). Deviations from norms are noted by the control center operator personnel, which may, in turn, result in increasing the rate of inquiring of the parolee/prisoner 38 to determine the reason for the deviations from expected travel times. This type of "learning" system or method permits detection of changes in individual travel habits and may indicate unauthorized activities of the parolee or prisoner 38 being tracked. As indicated in the earlier figures, an expert system (i.e. fuzzy logic, neural networks, reinforcement learning, etc.) algorithm may be used to indicate abnormal travel behavior.

FIG. 20 illustrates overlaying a ring/sector map 346 on the prisoner/parolee travel graph nodes of FIG. 19. In the ring/sector map 346 of FIG. 20, the area of travel is divided into eight sectors with three overlaying concentric ring areas. Individual nodes which the prisoner or parolee 38 may visit are then located in particular areas on the ring/sector map. Such a mapping permits additional control of travel by restricting the sectors and/or rings in which the prisoner/parolee 38 is permitted to travel. For example, using the ring/sector map of FIG. 20, travel in sector S31 and S38 may be prohibited. Thus, travel from node A 334 to B 336 would have to be within S32 with corresponding travel from node D 340 to B 336 avoiding sector S31. Similarly, to travel from nodes D 340 to E 342, the prisoner or parolee 38 will have to travel through sector S28, avoiding S38.

Travel between nodes A 334 and E 342 may require passing sector S37. This restriction of travels enables identification of areas where the prisoner or parolee 38 is prohibited from visiting. For example, sector S31 and S38 may be areas of high crime or drug/substance abuse, making it more desirable to keep a particular prisoner or parolee 38 out of those areas. Also, a sector travel matrix, similar to travel matrix as shown in FIG. 21, may be used to define permitted and prohibited travel sectors for a prisoner/parolee.

FIG. 23 depicts a location dwell time matrix 352. The entries in the matrix 352 indicate the maximum time that the particular prisoner or parolee 38 may spend at each of the designated locations. Node A 334 is the homebase of the prisoner or parolee 38, and no entry is recorded in the corresponding location. As indicated in the figure, for example, the prisoner/parolee 38 may spend 20 minutes at node B 336, 480 minutes at node C 338, 10 minutes at node D 340, 240 minutes at node E 342, and 300 minutes at node F 344, and so forth. Multiple versions of the matrix 352 may be kept in the prisoner/parolee control center 42 of FIGS. 3 and 5. Different matrices 352 may be used to indicate minimum times, average times, and maximum times that the prisoner or parolee 38 is expected to stay at different locations. Deviation from these times may cause the generation of warning signals from control center personnel resulting in a dispatch of police or security forces or, at least, inquiry of the prisoner or parolee 38 as to why duration of the stay at a particular location has deviated from previously recorded maximum, minimum, or average values. In a manner similar to that described above for the travel time matrix 350, the location dwell time matrix 352 may be updated periodically to indicate average dwell times at individual locations. In this way, the prisoner/parolee tracking and monitoring system may "learn" the behavior of a given prisoner or parolee 38 with respect to the time spent at individual locations. Once again deviations from expected or average times may be noted and appropriate inquiries or warning signals generated.

FIG. 24 illustrates a ring/sector time matrix 354 used to record the times which the prisoner or parolee 38 is permitted to spend in each of the ring/sector areas 354 of FIG. 20. If the prisoner/parolee 38 is not permitted in a given ring/sector area, the corresponding entry in the matrix 354 in FIG. 24 is zero. As indicated in matrix 354, the time $T_{00}$ (i.e. as shown in FIG. 24, $T_{12}$, $T_{15}$, $T_{21}$, $T_{22}$, $T_{27}$, $T_{28}$, $T_{32}$, $T_{35}$, $T_{37}$) is entered in corresponding column and row. As described above for the travel time matrix 350 and location dwell time matrix 352, multiple entries of the matrix 354 may be maintained in the storage of the prisoner/parolee control center 42 to record, for example, minimum, average, and maximum ring/sector times. Exceeding specified time intervals will result in generation of appropriate warning and/or inquiry messages depending upon the circumstances encountered. Once again, the average time spent in each ring/sector may be periodically updated to reflect change in the travel situation for the prisoner or parolee 38 being tracked. In this way, the prisoner/parolee tracking and warning system "learn" expected travel times in individual ring/sector areas which then may be compared to reported times to detect changes or deviations from expected behavior. Appropriate warning and dispatch messages may be issued depending on the circumstances.

The above examples illustrate that the data defining a set of allowed activities for each of the several classes of individuals 38 to be monitored includes but is not limited to permitted travel data, permitted location data, permitted location dwell time data, and permitted travel path data.

Figure 25:
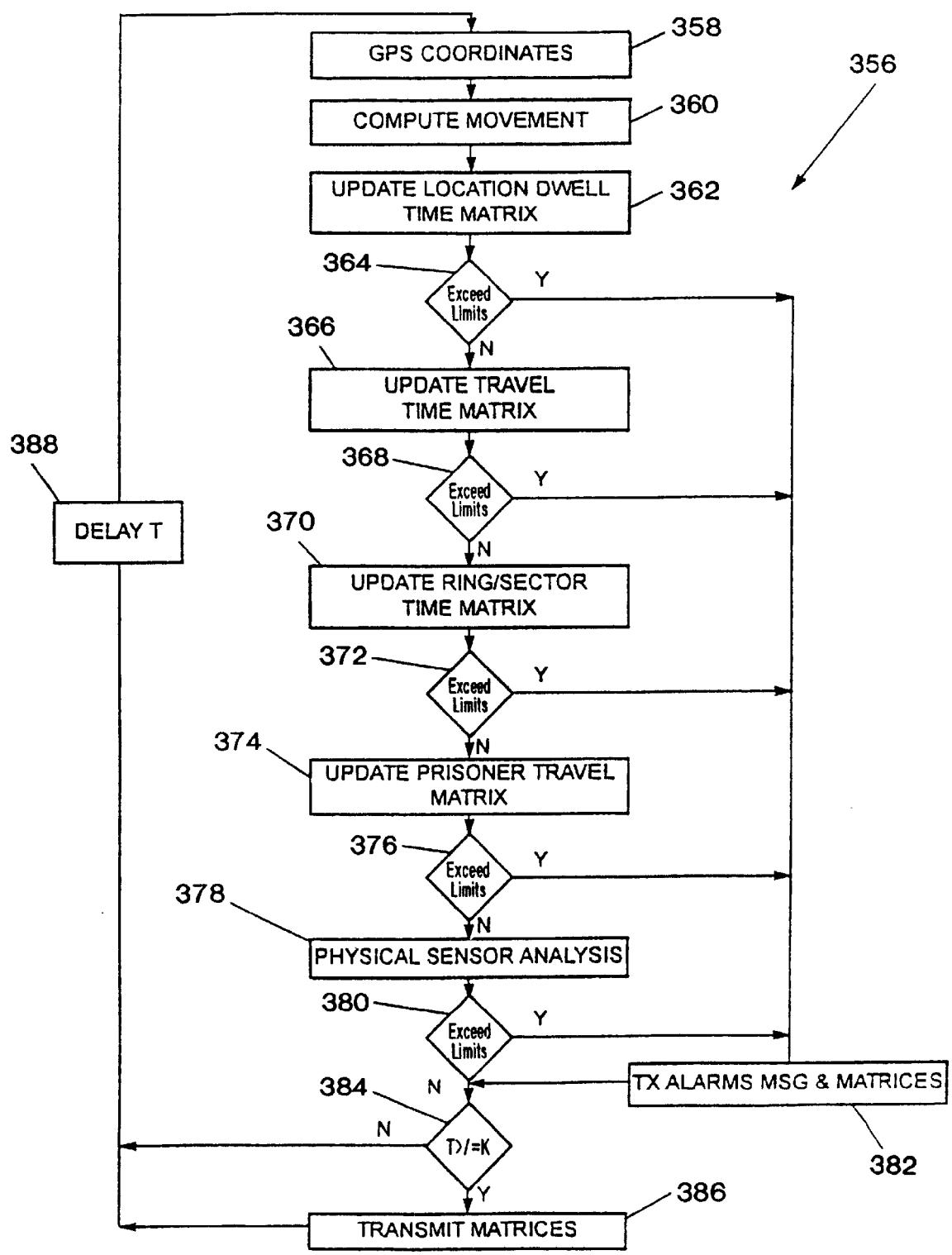
FIG. 25 is a prisoner or parolee monitor flow diagram illustrating top level logical flow of the prisoner/parolee tracking and monitoring systems and methods herein disclosed.

FIG. 25 illustrates a flow diagram 356 for the prisoner/parolee tracking and monitoring systems and methods herein disclosed. The flow diagram 356 corresponds to the operation of the prisoner/parolee sensor or processor unit 52 of FIG. 4 as described above. As indicated in FIG. 25, the prisoner/parolee tracking and monitoring system periodically obtains GPS coordinates at block 358 for the prisoner/parolee being tracked and monitored. At block 360 in FIG. 25, any movements of the prisoner/parolee 38 are computed, including movements corresponding to travel times between permitted locations such as those indicated in FIG. 19 and discussed above. At block 362 of FIG. 25, the location dwell time matrix 362 is updated reflecting time spent at a given location as appropriate.

Decision block 364 decides whether or not the dwell times in location matrix exceed specified time limits or orders. If the dwell times do exceed those limits, control is transferred to block 382 to transfer alarm/notation messages and corresponding matrix information to the prisoner/parolee control center 42. If the limits are not exceeded at block 364, then the travel time matrix is updated at block 366 and a test 368 is conducted to determine whether or not the travel times exceed those specified in matrix 350 of FIG. 22 described above. Once again, if the limits are exceeded, control is transferred to block 382 for transmission of alarm/notation messages and matrix data to the prisoner/parolee tracking and monitoring control center 42. If the limits are not exceeded, the travel ring/sector time matrix 354 is updated at block 370 and a test at decision block 372 is made to determine if limits as specified in matrices are exceeded.

Similarly, at block 374, the prisoner/parolee travel matrix 348 is updated; comparisons to previous matrices are made at decision block 376 to determine whether or not the prisoner/parolee 38 being tracked or monitored has traveled to an unauthorized destination as determined from the travel matrix. If such a determination is made, control is transferred to block 382 for transmission of appropriate alarm/notation messages and updated matrix values to prisoner/parolee control center 42.

At block 378, physical sensor analysis, using, for example, perspiration, breath, and heart rate sensors are performed as indicated in FIG. 25 and discussed above. If the test at decision block 380 indicates the physical sensor values are outside of acceptable limits indicating an agitated state or unacceptable use of drugs or alcohol, control s again transferred to block 382 for transmission of alarms/notations and matrix measurement parameters to control center 42. The flow diagram 356 of FIG. 25 includes the test at decision block 384 to compare the time T to determine whether or not it is greater than or equal to a preset value K. If T does not exceed the specified time K, then control is passed from decision block 384 directly to delay element 388 which has a specified delay T corresponding to intervals for monitoring the prisoner or parolee 38 using the herein disclosed tracking and monitoring method. When the specified delay time has been reached, the overall process of FIG. 25 is repeated with the various matrices again being updated and alarm signals generated if appropriate. If T does exceed the specified time K, then all matrices and data are transmitted to the prisoner/parolee control center 42 at block 386 for updating prisoner/parolee records for comparison purposes and subsequent monitoring and control operations. Control is passed from decision block 384 to transmit matrix element 386 and then to delay element 388 which has a specified delay T corresponding to intervals for monitoring the prisoner or parolee 38 using the herein disclosed tracking and monitoring method. When the specified delay time has been reached, the overall process of FIG. 25 is repeated with the various matrices again being updated and alarm signals generated if appropriate. In this manner, the system may monitor the movement and location of prisoners and parolees 38 at periodic intervals. Also, depending upon warning signals that may be generated, delay time T at block 388 may be adaptively decreased to accommodate situations requiring increased monitor frequencies if suspicious or unexpected activity is detected.

FIGS. 26–29 show specific features and examples of implementing prisoner/parolee learning algorithms which make use of expert systems such as artificial intelligence, reinforcement learning, fuzzy logic, and neural networks.

Figure 26:
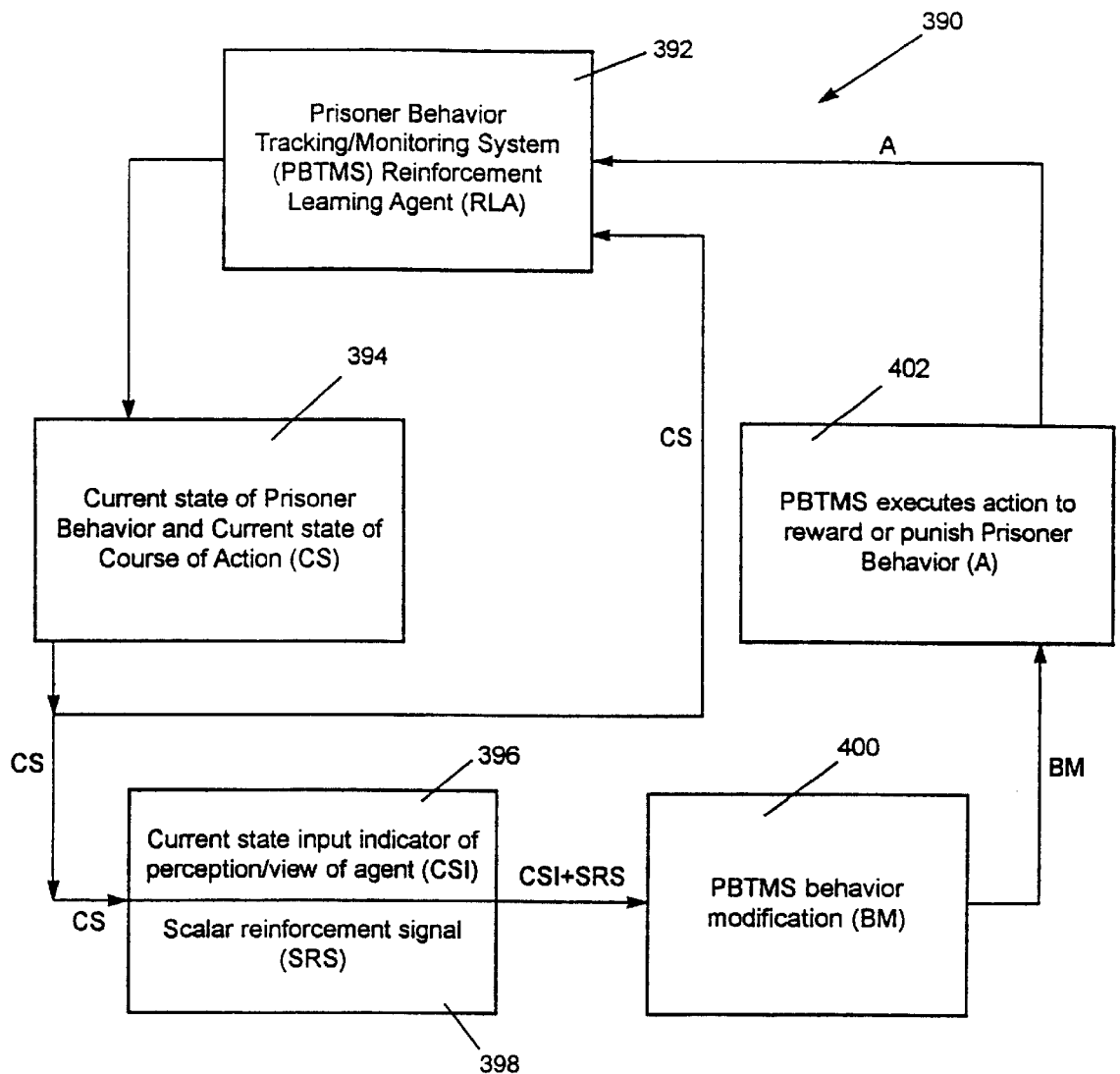
FIG. 26 is a general block diagram of the reinforcement learning algorithm of the prisoner/parolee behavior tracking or monitoring system.

FIG. 26 shows a reinforcement learning model 390 for the present Prisoner/Parolee Behavior Tracking/Monitoring System (PBTMS) in block diagram form. The model 390 has a PBTMS reinforcement learning agent (RLA) of block 392. The current state (CS) of the prisoner/parolee behavior is outputted from the RLA to block 394. The CS provides the state/status of the prisoner/parolee behavior and also provides the state/status of the course of action. The CS is fed into a current state input (CSI) indicator at block 396 which reflects the perception/view of the PBTMS agent to the current state (CS). The CS is also fed to a scalar reinforcement signal (SRS) at block 398 which provides the level of changes or adjustments that need to be performed or done on the CS. The CSI and SRS are factored into the CS to provide behavior modification (BM) for the PBTMS at block 400.

For example, by continuously monitoring a prisoner/parolee and by continuously updating the databases with information from the prisoner/parolee and from various sources that maintain a current comprehensive knowledge-based database of significant prisoner/parolee knowledge relevant to prisoner/parolee behavior, the trainable algorithms may be dynamically, empirically retrained by reshaping the algorithms through trial and error based on the original and updated information to optimize the accuracy of the preferred output. In such case, the trainable algorithm is a direct, adaptive, optimal control. The PBTMS then executes action(s) (A) to reward or punish prisoner/parolee behavior (A) at block 402 based on the BM. The action(s) A are fed back to the RLA at block 392, and a new current state (CS) of the prisoner/parolee behavior and current state of the course of action is outputted from the RLA at block 392. The new current state (CS) is also fed back to RLA to update the RLA with the new state/status of the prisoner/parolee behavior and the new state/status of the course of action.

Figure 27:
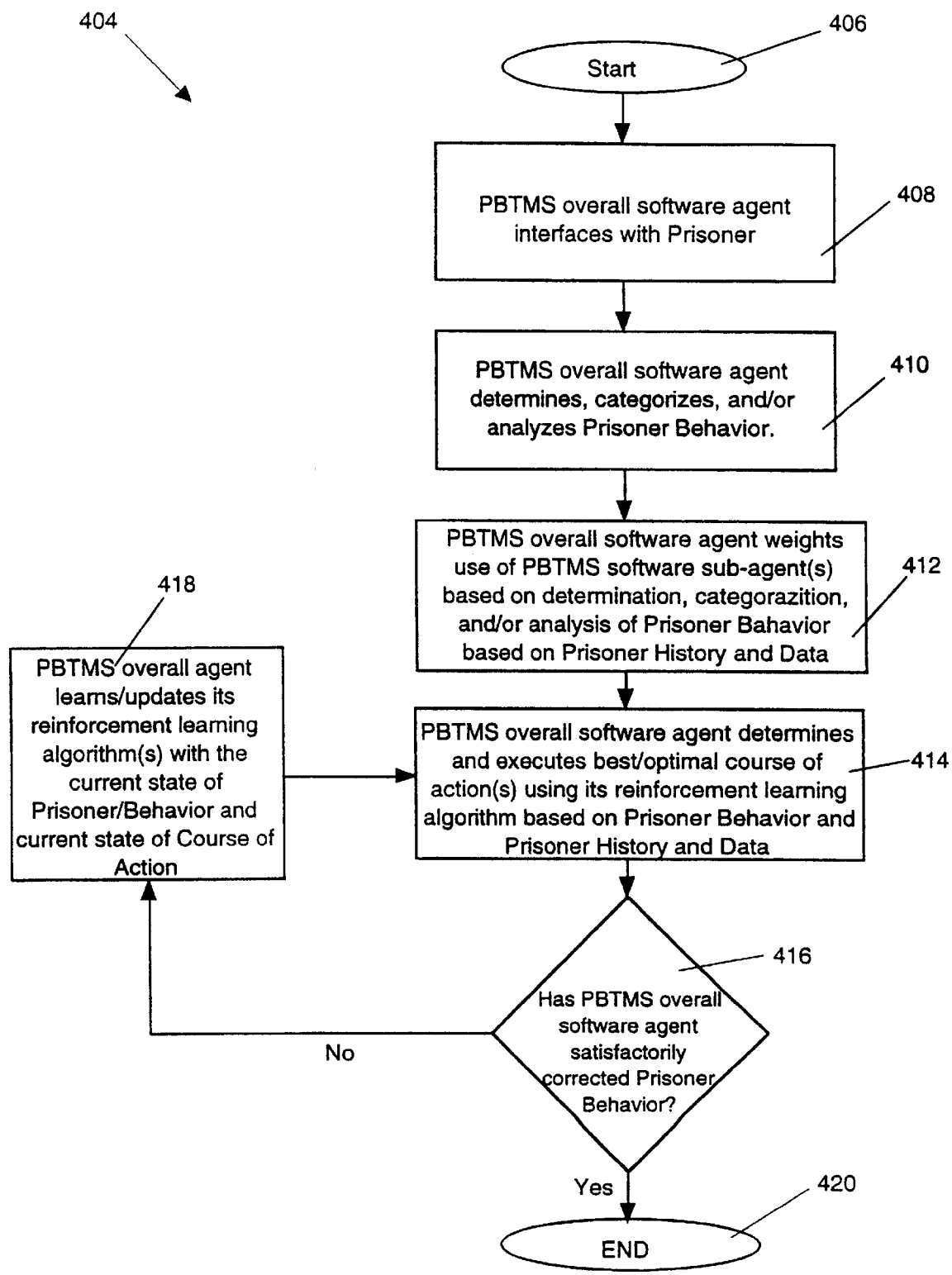
FIG. 27 is a more specific block diagram of the reinforcement learning algorithm of the prisoner/parolee behavior tracking or monitoring system.

FIG. 27 shows an overall PBTMS reinforcement learning software algorithm 404 that is executed by the PBTMS hardware. The PBTMS reinforcement learning algorithm starts at block 406. The PBTMS overall software agent interfaces with the user at block 408. The PBTMS overall software agent determines, categorizes, and/or analyzes prisoner/parolee behavior at block 410. The PBTMS overall software agent directs use of the PBTMS software sub-agent (s) based on the determination, categorization, and/or analysis of prisoner/parolee behavior based on prisoner/parolee history and data at block 412.

A t block 414, the PBTMS overall software agent determines and executes the best or optimal course of actions(s) using its reinforcement learning algorithm(s). The PBTMS overall software agent determines whether the prisoner/parolee behavior has been satisfactorily corrected at block 416. If the prisoner/parolee behavior has not been satisfactorily corrected, then the PBTMS overall agent learns or updates its reinforcement leaning with the current state of the prisoner/parolee behavior and the current state of the course of action at block 418, and the overall algorithm 404 loops back to block 414 to determine and execute the next best or optimal course of action(s). If the PBTMS overall software agent has satisfactorily corrected the prisoner/parolee behavior, then the overall algorithm 404 ends at block 420.

Figure 28:
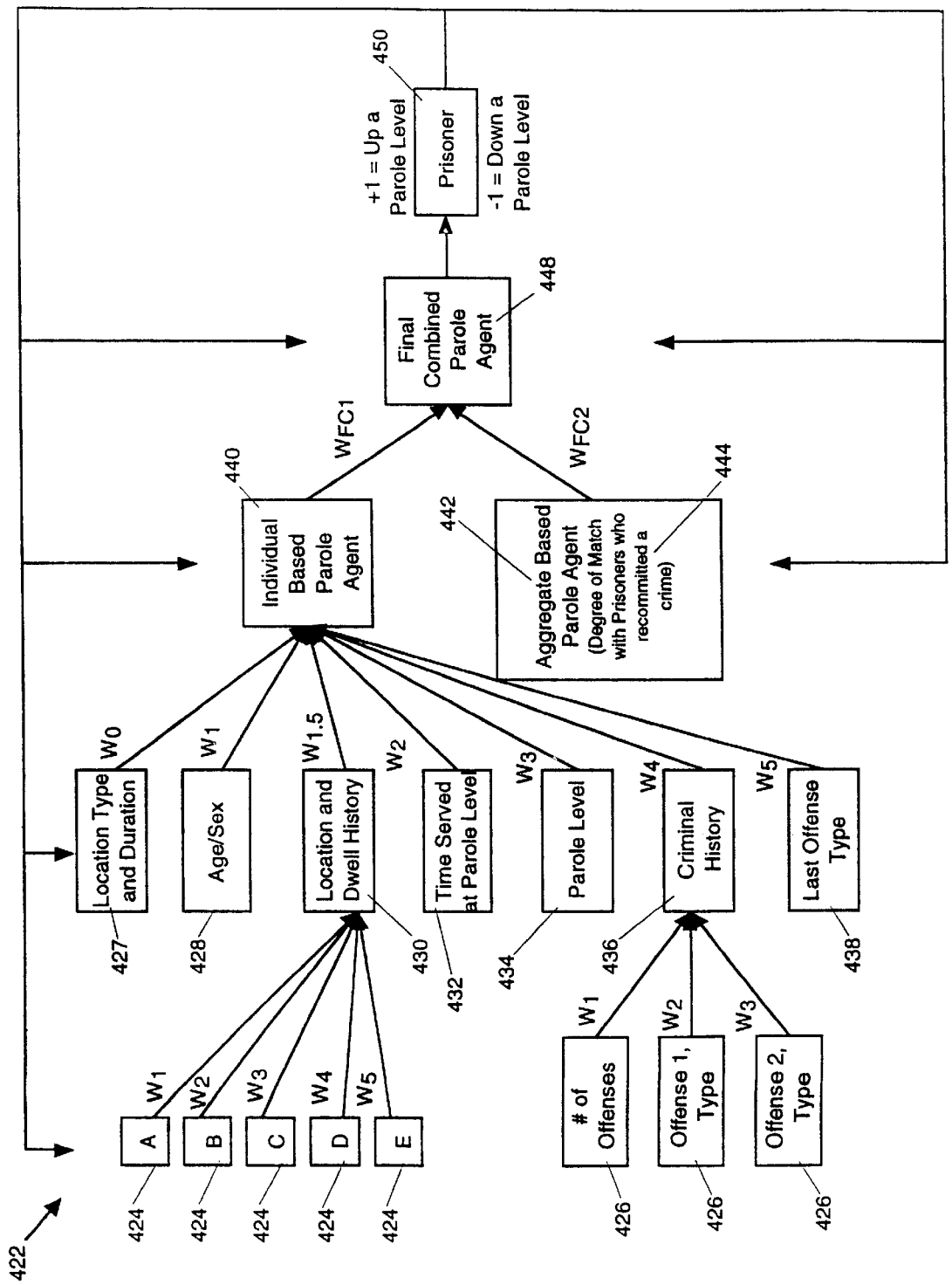
FIG. 28 is a block diagram of the parole agents and sub-agents used for the reinforcement learning algorithm of the prisoner/parolee behavior tracking or monitoring system.

FIG. 28 shows the artificial intelligent (reinforcement learning) parole sub-agents used in the reinforcement learning algorithm. The sub-agents are set up in a way so that low and lower level agents report to middle level agents and the middle level agents report to higher level agents. As shown in FIG. 28, sub-agents funnel towards an output that indicates whether the prisoners/parolees behavior should be rewarded or punished.

One type of lowest level agent is the location type sub-agent. FIG. 28 shows that various location types 424 are able to be defined. These location types include but are not limited to work, school, home, stores, gas stations, parks, banks, other business and recreational locations, etc. These location types are fed into a location/dwell time history sub-agent 440. Also, another type of lowest level agent is the criminal offense type sub-agent 426. FIG. 28 shows that various criminal offense types 426 are able to be defined. These criminal offense types include but are not limited to murder, robbery, theft burglary, arson, kidnapping, rape, sex offense, drug offense, alcohol related offense, etc. These criminal offense types are fed into a criminal history sub-agent 436.

The next level of agents are lower level agents. Weights are assigned to the various low level agents The lower level agents consider the weights of any inputted low level agents in determining the weight to be assigned to that corresponding lower level agent.

The location/dwell time history agent 430 and the criminal offense types agent 436 are two examples that were mentioned before that are lower level agents as shown in FIG. 28. Other examples of lower level agents are further shown in FIG. 28, and they include but are not limited to the following: Background, Age, Sex, etc. Sub-Agent 428; Time Served At Parole Level Sub-Agent 432; Parole Level Sub-Agent 434; Criminal History Sub-Agent 436; and Last Offense Type Sub-Agent 438.

These lower level agents are fed into a middle level agent that is an Individual Based Parole Sub-Agent 440. Weights are assigned to the various lower level agents. The individual based parole sub-agent 440 considers the weights of the various lower level agents in determining the weight to be assigned to the individual prisoner/parolee behavior. Another middle level agent is the aggregate based parole sub-agent 442. The aggregate based parole sub-agent 442 is statistically compiled data and algorithm(s) as to the degree of match with the prisoners/parolees who re-committed a crime. The aggregate based parole sub-agent 442 considers the statistically compiled data and algorithm(s) and assigns a weight based on the degree of match between an aggregate of prisoners/parolees who recommitted the same or similar crime in determining the weight to be assigned to the aggregate prisoner/parolee behavior.

The outputs from the individual based parole sub-agent 440 and the outputs from the aggregate based parole sub-agent 442 are fed into a higher level agent 448, which is the final combined parole agent 448. The outputs from the individual based parole subagent 440 and the aggregate based parole sub-agent 442 are weighted, and these weighted outputs are considered by the final combined parole agent 448 in determining whether the parole level for that prisoner/parolee should go up a level, remain at the same level, or go down a level as shown in FIG. 28. In FIG. 28, a "+1" represents the moving of the parole level for the prisoner/parolee up a level, a "0" represents the maintaining of the parole level for the prisoner/parolee at the same level, and a "−1" represents the moving of the parole level for the prisoner/parolee down a level. FIG. 28 also shows a general time-line indicating that the parole sub-agents move from past data to present data to predicted data.

FIG. 29 shows an aggregate probability identifier chart 452. The chart 452 is derived from a compilation of statistics from an aggregate number of prisoners/parolees 38. The probability graph of FIG. 29 charts different location types 424 against different crime types 426. The location types 424, as shown by examples in FIG. 29, include but are not limited to banks, bathrooms, casinos, fast food restaurants, bars, rural areas, gas stations, parking lots, residential areas, streets and sidewalks, parks, convenient stores, and schools. The crime types, as shown by example in FIG. 29, include but are not limited to fraud, auto theft, child molestation, murder, shoplifting, vandalism, robbery, arson, prostitution, kidnaping, rape, drugs, and driving under the influence. For each crime type, a probability is assigned to a particular location type 424 wherein the probability represents the chance that the particular crime type 426 will be committed at that particular location type 424.

The following are location type 424 examples for crime types 426. In FIG. 29, the first crime type 426 shown is fraud. For fraud, the high probability areas that a fraud crime may be committed is at banks or bank locations, in which a 100% probability is assigned to that location. In other words, fraud related crimes have a high probability or possibility of occurring at banks, and if a prisoner/parolee 38 is spending an unusual or abnormal amount of time at a bank, then the reinforcement learning algorithms of the prisoner/parolee tracking and monitoring system make note of or take appropriate action in response to the prisoner/parolee behavior. The middle probability areas that a fraud crime may be committed at some locations are as follows: at bathrooms (50%); at casinos (60%); at fast food restaurants (50%); at bars (50%); at residential areas (50%); at streets and sidewalks (50%). These middle probability areas are locations at which if a prisoner/parolee 38 is spending an unusual or abnormal amount of time, then the reinforcement learning algorithms of the prisoner/ parolee tracking and monitoring system may or may not make note of the behavior or take appropriate action and may or may not determine or conclude whether the prisoner/parolee is committing that type of crime or violation. The low probability areas that a fraud crime may be committed at some locations are as follows: rural areas (3%); gas stations (5%); parking lots (10%); parks (1%); convenient stores (1%); school (1%). The low probability areas are locations at which if a prisoner/parolee 38 is spending an unusual or abnormal amount of time, then reinforcement learning algorithms of the prisoner or parolee tracking/monitoring system will not make note of the behavior or take appropriate action and will not determine or conclude whether the prisoner/parolee 38 is committing that type of crime or violation.

Furthermore, the second crime type 426 shown is automobile theft. For automobile theft, the high probability areas that an auto theft crime may be committed are at some of the following locations: at parking lots (100%); at residential areas (80%); at streets and sidewalk areas (100%); at parks (90%); and convenient stores (70%). In other words, at these locations, auto theft crimes have a high probability or possibility of occurring, and if a prisoner/parolee 38 is spending an unusual abnormal amount of time at these locations, then the reinforcement learning algorithms of the prisoner or parolee tracking/monitoring system makes note of or takes appropriate action in response to the prisoner/parolee behavior. The middle probability areas that an automobile theft crime may be committed at some locations are as follows: at gas stations (40%) and at schools (60%). The middle probability areas are locations at which if a prisoner/parolee 38 is spending an unusual or abnormal amount of time, then the reinforcement learning algorithms of the prisoner or parolee tracking/monitoring system may or may not make note of the behavior or take appropriate action and may or may not determine or conclude whether the prisoner/parolee 38 is committing that type of crime or violation. The low probability areas that an automobile theft crime may be committed at some locations are as follows: at banks (0%); at bathrooms (0%); at casinos (5%); at fast food restaurants (0%); at bars (5%); and at rural areas (10%). The low probability areas are locations at which if a prisoner/parolee 38 is spending an unusual or abnormal amount of time, then the reinforcement learning algorithms of the prisoner or parolee tracking/monitoring system will not make note of the behavior or take appropriate action and will not determine or conclude whether the prisoner/parolee 38 is committing that type of crime or violation.

Additionally, the third crime type 426 shown is child molestation. For child molestation, the high probability areas that a child molestation crime may be committed are at some of the following locations: at parking lots (100%); at residential areas (100%); at streets and sidewalks (100%); at parks (100%); and at school (100%). In other words, at these locations, child molestation crimes have a high probability of occurring, and if a prisoner/parolee 38 is spending an unusual or abnormal amount of time at these locations, then the reinforcement learning algorithms of the prisoner or parolee tracking/monitoring system makes note of or takes appropriate action in response to the prisoner/parolee behavior. The middle probability areas that a child molestation crime may be committed at some locations are as follows: at bathrooms (50%); at casinos (50%); at fast food restaurants (50%); and at rural areas (50%). The middle probability areas are locations at which if a prisoner/parolee 38 is spending an unusual or abnormal amount of time, then the reinforcement learning algorithms of the prisoner or parolee tracking/monitoring system may or may not make note of the behavior or take appropriate action and may or may not determine or conclude whether the prisoner/parolee 38 is committing that type of crime or violation. The low probability areas that a child molestation crime may be committed at some locations are as follows: at banks (0%); at bars (10%); at gas stations (30%); and at convenient stores (30%). The low probability areas are locations at which if a prisoner/parolee is spending an unusual or abnormal of time, then the reinforcement learning algorithms of the prisoner or parolee tracking/monitoring system will not make note of the behavior or take appropriate action and will not determine or conclude whether the prisoner/parolee 38 is committing that type of crime or violation.

The other crime types 426 are assigned probabilities to each location type 424 in the similar way and manner that the fraud, auto theft, and child molestation crimes have been assigned probabilities. The reinforcement learning algorithms of the prisoner/parolee tracking or monitoring system uses these probabilities to predict future crimes/violations of various prisoners/parolees 38. The algorithms use these probabilities to make the determination of whether or not a crime or violation is being committed. The probabilities may be based on information from the individual prisoner/parolee information from an aggregate number of prisoners/parolees 38. The probabilities and weights are adjusted by the reinforcement learning algorithms based on analysis, conclusions, and results. The weights and probabilities may be adjusted according to the individual prisoner/parolee behavior, the aggregate pattern and behaviors of prisoners/parolee 38, the specific environment and demographics (i.e. certain crimes may occur more frequently at specific locations than other locations), and the aggregate or overall environment and demographics.

Scope of Disclosure

The preferred embodiments of the inventions are described in the figures and detailed description. Unless specifically noted, it is applicants' intention that the words and phrases in the specification and claims be given the ordinary and accustomed meaning to those of ordinary skill in the applicable art(s). If applicant intend any other meaning, they will specifically state they are applying a special meaning to a word or phrase.

Likewise, applicants' use of the word "function" in the Detailed Description is not intended to indicate that they seek to invoke the special provisions of 35 U.S.C. Section 112, paragraph 6 to define their invention. To the contrary, if applicants wish to invoke the provision of 35 U.S.C. Section 112, paragraph 6, to define their invention, they will specifically set forth in the claims the phrases "means for" or "step for" and a function, without also reciting in that phrase any structure, material or act in support of the function. Moreover, even if applicant invokes the provisions of 35 U.S.C. Section 112, paragraph 6, to define their invention, it is applicant's intention that their inventions not be limited to the specific structure, material, or acts that are described in the preferred embodiments. Rather, if applicants claim their invention by specifically invoking the provisions of 35 U.S.C. Section 112, paragraph 6, it is nonetheless their intention to cover and include any and all structures, materials or acts that perform the claimed function, along with any and all known or later developed equivalent structures, materials, or acts for performing the claimed function.

For example, there are disclosed several algorithms for tracking, monitoring, and/or learning prisoner behavior. In its preferred form, applicant divides these algorithms into several steps. However, with appropriate structuring and/or programming well known to those of ordinary skill in the art, the inventions can be implemented using fewer steps. Thus, it is not applicants' intention to limit their invention to any particular form of algorithm.

Additionally, there are disclosed several algorithms for tracking, monitoring, and/or learning prisoner behavior that use expert systems (i.e. including but not limited to reinforcement learning, artificial intelligence, fuzzy logic, neural networks, etc.). In its preferred form, applicant divides these algorithms into several operations. However, with appropriate structuring and/or programming well known to those of ordinary skill in the art, the inventions can be implemented using fewer operations. Thus, it is not applicants' intention to limit their invention to any particular form of algorithm. Also, the inventions described herein are not to be limited to specific expert systems disclosed in the preferred embodiments, but rather, are intended to be used with any and all such systems.

Similarly, the inventions described herein are not to be limited to specific communications hardware, devices, or methods (i.e. which include but are not limited to radio, two-way radio, cellular, telephone, modem, satellite communications, etc.) disclosed in the preferred embodiments, but rather, are intended to be used with any all such applicable communications hardware, devices, or methods for communicating between the prisoner/parolee, a location of the prisoner/parolee, and/or the control center of the present invention.

As a further example, the present inventions make use of GPS satellite location technology for deriving prisoner location and motion trajectory parameters for use in the prisoner tracking and warning systems and methods herein disclosed. The inventions described herein are not to be limited to specific GPS devices disclosed in the preferred embodiments, but rather, are intended to be used with any and all such applicable satellite or ground based location devices, systems and methods, as long as such devices, systems and methods generate input signals that can be analyzed by a computer to detect and accurately quantify prisoner or parolee location and motion parameters.

Likewise, for example, the present inventions generate prisoner or parolee monitoring or surveillance information, including analysis of body functions such as heart rate or perspiration chemical composition for analysis. The inventions described herein are not to be limited to specific monitoring or sensing devices disclosed in the preferred embodiments, but rather, are intended to be used with any and all applicable monitoring or sensing devices, as long as the device can generate an input signal that can be analyzed by a computer to detect dangerous or unusual situations. Accordingly, the words "monitor" and "sensor" as used in this specification should be interpreted broadly and generically.

Further, there are disclosed several computers, controllers, and computer hardware, that perform various control operations. The specific form of computer or computer hardware is not important to the invention. In its preferred form, applicant divides the computing and analysis operations into several cooperating computers or microprocessors. However, with appropriate structuring and/or programming the inventions can be implemented using fewer, high powered or specialized computers, processors, or other computer hardware. Thus, it is not applicants' intention to limit their invention to any particular form of computer.

Further example exist throughout the disclosure, and it is not applicants' intention to exclude from the scope of their invention the use of structures, materials, or acts that are not expressly identified in the specification, but nonetheless are capable of performing a claimed function.

The inventions set forth above are subject to many modifications and changes without departing from the spirit, teachings, or essential characteristics thereof. The embodiments explained above should be considered in all respects as being representative rather than being restrictive of the scope of the invention as defined in the appended claims.

We claim:

1. A system to monitor a subject comprising:
   a) a monitoring station computer having a first file including reference behavior data of one class of individual to be monitored;
   b) a second file in the monitoring station computer including behavior data defining the subject to be monitored;
   c) a defined set of allowed activities for the class of individual being monitored programmed into the monitoring station computer;
   d) a remote monitoring transmitter and receiver attached to the subject periodically transmitting data to the monitoring station computer;
   e) a satellite global positioning system cooperating with the transmitter and receiver attached to the subject to determine the subject's current location;
   f) a program in the monitoring station computer to analyze the data transmitted from the remote monitoring transmitter to determine if there are variations from the allowed activities and if there are variations the generate a first alarm signal;
   g) an expert system associated with the monitoring station computer, the expert system programmed to recognize a continuum of degrees of alarms based on a comparison of the variation of the behavior data defining the subject to be monitored, and the reference behavior data of the monitored subject;
   h) a second alarm signal generated by the expert system defining a specific recommend course of action appropriate in the case of the monitored subject.

2. The invention in accordance with claim 1 wherein the first file of reference behavior data includes several classes of reference behavior data.

3. The invention in accordance with claim 2 wherein the set of allowed activities includes sets of allowed activities for each class of reference behavior data.

4. The invention in accordance with claim 1 wherein the system monitors multiple subjects and wherein the first file of reference behavior data includes several classes of reference behavior data and the set of allowed activities includes sets of allowed activities for each class of reference behavior data.

5. The invention in accordance with claim 2 where the reference behavior data comprises criminal behavior data relating to the several classes of individuals.

6. The invention in accordance with claim 2 wherein the reference behavior data comprises criminal history and criminal record data relating to the several classes of individuals.

7. The invention in accordance with claim 2 wherein the reference behavior data comprises parole level information relating to the several classes of individuals.

8. The invention in accordance with claim 2 wherein the reference behavior data comprises data relating to a number of different types of crimes from the several classes of individuals.

9. The invention in accordance with claim 2 wherein the reference behavior data comprises data relating to a defined deviated behavior standard derived from the several classes of individuals.

10. The invention in accordance with claim 2 wherein the reference behavior data comprises crime probability data that compares various crime types with various location types wherein a crime probability for each of the various crime types is determined and assigned for each of the various location types.

11. The invention in accordance with claim 2 wherein the behavior data defining the subject to be monitored comprises criminal history and criminal record data relating to the subject.

12. The invention in accordance with claim 2 wherein the behavior data defining the subject to be monitored comprises criminal history and criminal record data relating to the subject.

13. The invention in accordance with claim 2 wherein the behavior data defining the subject to be monitored comprises data relating to the types of crimes committed by the subject.

14. The invention in accordance with claim 2 wherein the data defining the set of allowed activities for each of the several classes of individuals to be monitored comprises permitted travel data for each of the several classes of individuals to be monitored.

15. The invention in accordance with claim 14 wherein the data defining the set of allowed activities for each of the several classes of individuals to be monitored comprises permitted location data for each of the several classes of individuals to be monitored.

16. The invention in accordance with claim 14 wherein the data defining the set of allowed activities for each of the several classes of individuals to be monitored comprises permitted location dwell time data for each of the several classes of individuals to be monitored.

17. The invention in accordance with claim 14 wherein the data defining the set of allowed activities for each of the several classes of individuals to be monitored comprises permitted travel path data for each of the several classes of individuals to be monitored.

18. The invention in accordance with claim 1 further comprising an audible alarm with the remote monitoring transmitter and receiver which is activated by a signal transmitted from the monitoring station computer to the remote transmitter and receiver attached to the subject.

19. The invention in accordance with claim 1 further comprising a physical attribute monitor carried by the subject and in communication with the remote monitoring transmitter and receiver attached to the subject.

20. The invention in accordance with claim 19 wherein the physical attribute monitor comprises a microphone.

21. The invention in accordance with claim 19 wherein the physical attribute monitor comprises an alcohol detector.

22. The invention in accordance with claim 19 wherein the physical attribute monitor comprises a heart rate monitor.

23. The invention in accordance with claim 19 wherein the physical attribute monitor comprises a breath rate monitor.

24. The invention in accordance with claim 19 wherein the physical attribute monitor comprises a perspiration monitor.

* * * * *